(12) United States Patent
Kobayashi

(10) Patent No.: US 7,865,529 B2
(45) Date of Patent: Jan. 4, 2011

(54) BATCH PROCESSING APPARATUS

(75) Inventor: Yoshifumi Kobayashi, Tokyo (JP)

(73) Assignee: Intelligent Model, Limited, Tokyo (JP)

( * ) Notice: Subject to any disclaimer, the term of this patent is extended or adjusted under 35 U.S.C. 154(b) by 1179 days.

(21) Appl. No.: 10/579,821

(22) PCT Filed: Nov. 18, 2003

(86) PCT No.: PCT/JP03/14646
§ 371 (c)(1),
(2), (4) Date: May 17, 2006

(87) PCT Pub. No.: WO2005/050447
PCT Pub. Date: Jun. 2, 2005

(65) Prior Publication Data
US 2009/0024997 A1    Jan. 22, 2009

(51) Int. Cl.
G06F 17/30 (2006.01)
(52) U.S. Cl. .................. 707/796; 707/804; 718/101
(58) Field of Classification Search .............. 707/1,
707/100, 101, 200, 600, 603, 793, 804, 821,
707/705, 707, 796, 802, 803, 805, 999.001,
707/999.004, 999.1, 999.101; 718/101, 1,
718/100
See application file for complete search history.

(56) References Cited

U.S. PATENT DOCUMENTS 5,497,491 A * 3/1996 Mitchell et al. ............ 719/315
5,787,412 A * 7/1998 Bosch et al. ................ 707/2
6,044,367 A * 3/2000 Wolff ......................... 707/2
6,108,657 A * 8/2000 Shoup et al. ............... 707/100
6,308,178 B1 * 10/2001 Chang et al. ............... 707/100
6,581,057 B1 * 6/2003 Witbrock et al. ........... 707/5
6,640,244 B1 * 10/2003 Bowman-Amuah ........ 709/207

FOREIGN PATENT DOCUMENTS

| JP | 5-197533 | 8/1993 |
| JP | 8-272815 | 10/1996 |
| JP | 11-175327 | 7/1999 |
| JP | 2001-060150 | 3/2001 |

OTHER PUBLICATIONS

Michael Abbey et al., "Oracle Database Beginners Guide", 1st edition, Kabushiki Kaisha Shoeisha, 1996, p. 26-27.

* cited by examiner

Primary Examiner—Greta L Robinson
(74) Attorney, Agent, or Firm—Rabin & Berdo, P.C.

(57) ABSTRACT

There are provided a batch processing apparatus and a batch processing method capable of significantly reducing the burden on a system designer, a system administrator, and an operator operating the system as well as significantly reducing the development cost. The batch processing apparatus acquires from a repository the metadata defined as information on at least data item name, input, processing content, and output, as well as information stored and registered in advance in the predetermined repository, inputs input data according to a declaration process of the acquired metadata, creates output data by processing the input data, and outputs the output data. Herein, the batch processing apparatus creates the output data by changing all the output data related to the metadata according to change of the metadata.

7 Claims, 35 Drawing Sheets

F I G. 7
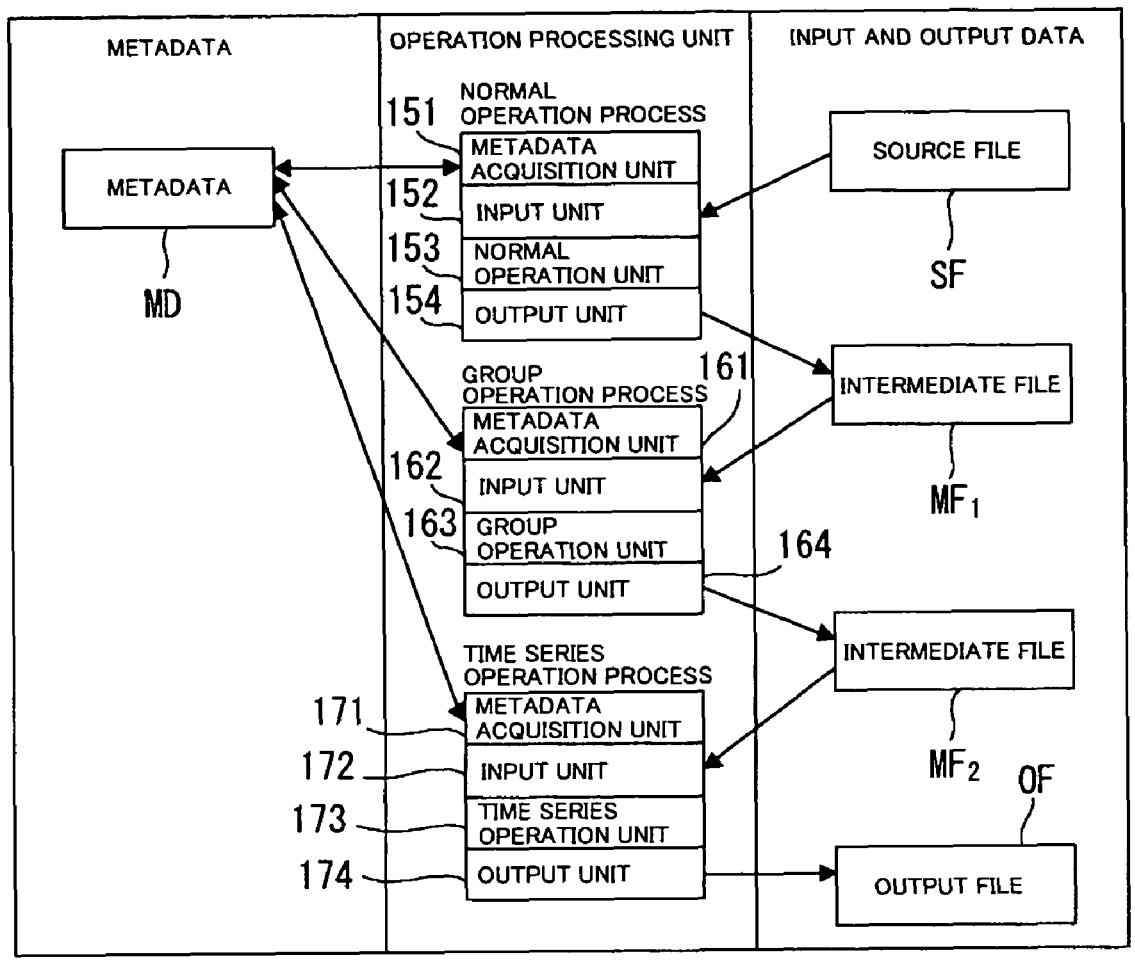

F I G. 9
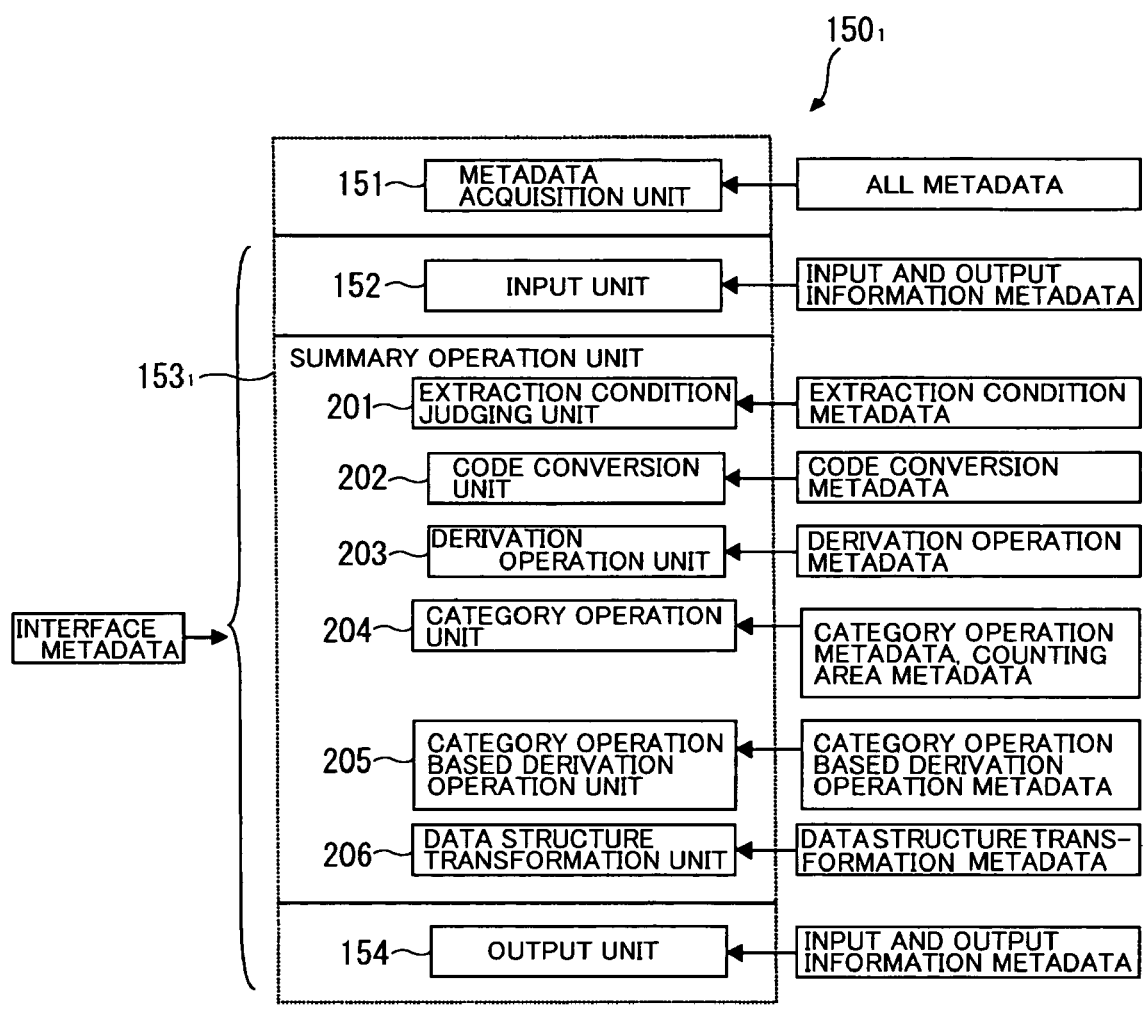

FIG. 17A

BRANCH OFFICE TABLE

| BRANCH OFFICE NUMBER | BRANCH OFFICE NAME | BRANCH OFFICE ADDRESS | BRANCH OFFICE TYPE | EAST JAPAN DISPLAY | WEST JAPAN DISPLAY | ... |
|---|---|---|---|---|---|---|

FIG. 17B

CUSTOMER TABLE

| CUSTOMER NUMBER | BRANCH OFFICE NUMBER | NAME | ADDRESS | AREA CODE | INDUSTRIAL CLASSIFICATION CODE | COMPANY SIZE CODE | CONTRACT DAY | ... |
|---|---|---|---|---|---|---|---|---|

FIG. 17C

TRANSACTION TABLE

| TRANSACTION NUMBER | CUSTOMER NUMBER | PRODUCT CODE | TRANSACTION CODE | TRANSACTION MONEY AMOUNT | ACCOUNT DAY | ... |
|---|---|---|---|---|---|---|

FIG. 18

DATE x x YEAR x x MONTH x x DAY  BRANCH OFFICE NO. x x x  BRANCH OFFICE NAME x x x x x x x x

| | TRANSACTION MONEY AMOUNT | TRANSACTIONS a THROUGH c MONEY AMOUNT | TRANSACTIONS d AND e MONEY AMOUNT | TYPE-A PRODUCT TRANSACTION MONEY AMOUNT | TYPE-B PRODUCT TRANSACTION MONEY AMOUNT |
|---|---|---|---|---|---|
| MANUFACTURING INDUSTRY | | | | | |
| PRIMARY INDUSTRY | | | | | |
| SECONDARY INDUSTRY | | | | | |
| TERTIARY INDUSTRY | | | | | |
| TOKYO · LARGE COMPANY | | | | | |
| MEDIUM AND SMALL COMPANY | | | | | |
| INCLUSIVE SUM | | | | | |

FIG. 19

DATE  x x YEAR x x MONTH x x DAY   BRANCH OFFICE NO. x x x   BRANCH OFFICE NAME x x x x x x x x

|  | TRANSACTION MONEY AMOUNT FROM 0 TO 5,000,000 YEN | TRANSACTION MONEY AMOUNT FROM 5,000,000 TO 10,000,000 YEN | TRANSACTION MONEY AMOUNT MORE THAN 10,000,000 YEN | PREVIOUS DAY'S AMOUNT | COMPARISON OF PREVIOUS DAY'S TRANSACTION MONEY AMOUNT WITH THAT OF END OF PREVIOUS MONTH |
|---|---|---|---|---|---|
| PRODUCT 1 | | | | | |
| PRODUCT 2 | | | | | |
| PRODUCT 3 | | | | | |
| PRODUCT 4 | | | | | |
| PRODUCT 5 | | | | | |
| MEDIUM AND SMALL COMPANY | | | | | |
| INCLUSIVE SUM | | | | | |

FIG. 20

| CATEGORY | CATEGORY HIERARCHY | |
|---|---|---|
| AGRICULTURAL INDUSTRY | | PRIMARY INDUSTRY |
| FOREST INDUSTRY | | |
| FISHING INDUSTRY | AQUA PRODUCTS INDUSTRY | |
| AQUACULTURE INDUSTRY | | |
| GENERAL INDUSTRIAL MACHINE MANUFACTURING INDUSTRY | MANUFACTURING INDUSTRY | SECONDARY INDUSTRY |
| PRECISION MACHINE MANUFACTURING INDUSTRY | | |
| ○○ MANUFACTURING INDUSTRY | | |
| FOOD PRODUCT | | |
| XXXX | | |
| BANK | | TERTIARY INDUSTRY |
| FINANCING SERVICE | | |
| △△△ | | |

FIG. 21

| CATEGORY | CATEGORY HIERARCHY |
|---|---|
| HOKKAIDO | — |
| . | . |
| SAITAMA | — |
| CHIBA | — |
| TOKYO | TOKYO |
| KANAGAWA | — |
| . | . |
| OKINAWA | — |

FIG. 22

| CATEGORY | CATEGORY HIERARCHY | |
|---|---|---|
| PRODUCT 1 | TYPE-A PRODUCT | |
| PRODUCT 2 | TYPE-A PRODUCT | |
| PRODUCT 3 | TYPE-A PRODUCT | |
| PRODUCT 4 | | TYPE-B PRODUCT |
| PRODUCT 5 | | TYPE-B PRODUCT |

FIG. 23

| CATEGORY | CATEGORY HIERARCHY |
|---|---|
| TRANSACTION a | TRANSACTIONS a THROUGH c |
| TRANSACTION b | |
| TRANSACTION c | |
| TRANSACTION d | TRANSACTIONS d AND e |
| TRANSACTION e | |

FIG. 24

| CATEGORY | CATEGORY HIERARCHY |
|---|---|
| LARGE COMPANY | LARGE COMPANY |
| MEDIUM COMPANY | MEDIUM AND SMALL COMPANY |
| SMALL COMPANY | |

FIG. 25

| CATEGORY | CATEGORY HIERARCHY |
|---|---|
| 0 TO 5,000,000 YEI | 0 TO 5,000,000 YEN |
| 5,000,000 TO 10,000,000 YEN | 5,000,000 TO 10,000,000 YEN |
| MORE THAN 10,000,000 YEN | MORE THAN 10,000,000 YEN |

FIG. 26

| BRANCH OFFICE NUMBER | BRANCH OFFICE NAME | EAST JAPAN DISPLAY | WEST JAPAN DISPLAY |
|---|---|---|---|
| 001 | SAPPORO | 1 | 0 |
| 002 | SENDAI | 1 | 0 |
| 003 | TOKYO | 1 | 0 |
| 004 | OSAKA | 0 | 1 |
| 005 | FUKUOKA | 0 | 1 |

FIG. 27A

| GENERAL ATTRIBUTE INFORMATION | | |
|---|---|---|
| DATA ITEM NAME | PHONETIC CHARACTER | ... |
| BRANCH OFFICE NUMBER | XXXXX | ... |
| COSTOMER NAME | XXXXX | ... |
| . | . | ... |

FIG. 27B

| CLASSIFYING ATTRIBUTE INFORMATION | | |
|---|---|---|
| DATA ITEM NAME | PHONETIC CHARACTER | ... |
| PRODUCT CODE | XXXXX | ... |
| INDUSTRIAL CLASSIFICATION CODE | XXXXX | ... |
| . | . | ... |

FIG. 27C

| CATEGORY INFORMATION | | | | |
|---|---|---|---|---|
| CLASSIFYING ATTRIBUTE NAME | CATEGORY NAME | PHONETIC CHARACTER | CODE VALUE | ... |
| PRODUCT CODE | PRODUCT 1 | XXXX | 1 | ... |
| PRODUCT CODE | PRODUCT 2 | XXXX | 2 | ... |
| . | . | . | . | ... |
| INDUSTRIAL CLASSIFICATION CODE | AGRICULTURAL INDUSTRY | XXXX | 001 | ... |
| INDUSTRIAL CLASSIFICATION CODE | MANUFACTURING INDUSTRY | XXXX | 002 | ... |
| . | . | . | . | ... |

FIG. 27D

| CATEGORY HIERARCHY INFORMATION | | | |
|---|---|---|---|
| CLASSIFYING ATTRIBUTE INFORMATION | CATEGORY NAME | HIERARCHY CATEGORY NAME | ... |
| PRODUCT CODE | PRODUCT 1 | TYPE-A PRODUCT | ... |
| PRODUCT CODE | PRODUCT 2 | TYPE-A PRODUCT | ... |
| PRODUCT CODE | PRODUCT 3 | TYPE-A PRODUCT | ... |
| PRODUCT CODE | PRODUCT 4 | TYPE-A PRODUCT | ... |
| . | . | . | ... |
| INDUSTRIAL CLASSIFICATION CODE | AGRICULTURAL INDUSTRY | PRIMARY INDUSTRY | ... |
| INDUSTRIAL CLASSIFICATION CODE | FISHING INDUSTRY | PRIMARY INDUSTRY | ... |
| INDUSTRIAL CLASSIFICATION CODE | FOREST INDUSTRY | PRIMARY INDUSTRY | ... |
| . | . | . | ... |

FIG. 28A

| FILE LIST | | | |
|---|---|---|---|
| BUSINESS SERVICE CLASSIFICATION | TABLE NAME | MEDIUM TYPE | ... |
| BUSINESS SERVICE A | BRANCH OFFICE TABLE | XXXXX | ... |
| BUSINESS SERVICE A | CUSTOMER TABLE | XXXXX | ... |
| BUSINESS SERVICE A | TRANSACTION TABLE | XXXXX | ... |

FIG. 28B

| SCHEMA ABOUT FILE | | | | | | |
|---|---|---|---|---|---|---|
| BUSINESS SERVICE CLASSIFICATION | TABLE NAME | DATA ITEM NAME | COLUMN NAME | DATA ATTRIBUTE | LENGTH | ... |
| BUSINESS SERVICE A | BRANCH OFFICE TABLE | BRANCH OFFICE NUMBER | XXXX | XXXX | XXXX | ... |
| BUSINESS SERVICE A | BRANCH OFFICE TABLE | BRANCH OFFICE NAME | XXXX | XXXX | XXXX | ... |
| . | . | . | . | . | . | . |

FIG. 28C

| MANAGEMENT UNIT | | | | | | |
|---|---|---|---|---|---|---|
| BUSINESS SERVICE CLASSIFICATION | MANAGEMENT UNIT NAME | CORRESPONDING FILE | COLUMN NAME (PK) | COLUMN NAME (PK) | COLUMN NAME (PK) | ... |
| BUSINESS SERVICE A | BRANCH OFFICE | BRANCH OFFICE TABLE | BRANCH OFFICE NUMBER | — | — | ... |

FIG. 28D

| LIST OF FILES USED IN EACH PROCESS | | | | | |
|---|---|---|---|---|---|
| BUSINESS SERVICE CLASSIFICATION | CYCLE | MANAGEMENT UNIT | SPECIFICATION/SUMMARY | INPUT FILE | ... |
| BUSINESS SERVICE A | DAILY | BRANCH OFFICE | SUMMARY | BRANCH OFFICE TABLE | ... |
| BUSINESS SERVICE A | DAILY | BRANCH OFFICE | SUMMARY | CUSTOMER TABLE | ... |
| BUSINESS SERVICE A | DAILY | BRANCH OFFICE | SUMMARY | TRANSACTION TABLE | ... |

FIG. 28E

| RELATION LIST OF FILES USED IN EACH PROCESS | | | | | | | |
|---|---|---|---|---|---|---|---|
| BUSINESS SERVICE CLASSIFICATION | CYCLE | MANAGEMENT UNIT | SPECIFICATION /SUMMARY | FILE | FILE | PK·· | FK·· |
| BUSINESS SERVICE A | DAILY | BRANCH OFFICE | SUMMARY | BRANCH OFFICE TABLE | CUSTOMER TABLE | XXXX | XXXX |
| BUSINESS SERVICE A | DAILY | BRANCH OFFICE | SUMMARY | CUSTOMER TABLE | TRANSACTION TABLE | XXXX | XXXX |

FIG. 29A

| NAME OF USER'S VIEW | | | | | | | |
|---|---|---|---|---|---|---|---|
| BUSINESS SERVICE CLASSI- FICATION | CYCLE | MANAGEMENT UNIT | SPECIFICATION /SUMMARY | USER'S VIEW NAME | USER'S VIEW NUMBER | HOLDING PERIOD | ... |
| BUSINESS SERVICE A | DAILY | BRANCH OFFICE | SUMMARY | XXXXX | 1 | 30DAYS | ... |
| BUSINESS SERVICE A | DAILY | BRANCH OFFICE | SUMMARY | XXXXX | 2 | 30DAYS | ... |

FIG. 29B

| HEADING ITEM OF USER'S VIEW | | | | | | |
|---|---|---|---|---|---|---|
| BUSINESS SERVICE CLASSI- FICATION | CYCLE | MANAGEMENT UNIT | SPECIFICATION /SUMMARY | USER'S VIEW NUMBER | ATTRIBUTE NAME | ... |
| BUSINESS SERVICE A | DAILY | BRANCH OFFICE | SUMMARY | 1 | DATE | ... |
| BUSINESS SERVICE A | DAILY | BRANCH OFFICE | SUMMARY | 1 | BRANCH OFFICE NUMBER | ... |
| BUSINESS SERVICE A | DAILY | BRANCH OFFICE | SUMMARY | 1 | BRANCH OFFICE NAME | ... |
| BUSINESS SERVICE A | DAILY | BRANCH OFFICE | SUMMARY | 2 | DATE | ... |
| BUSINESS SERVICE A | DAILY | BRANCH OFFICE | SUMMARY | 2 | BRANCH OFFICE NUMBER | ... |
| BUSINESS SERVICE A | DAILY | BRANCH OFFICE | SUMMARY | 2 | BRANCH OFFICE NAME | ... |

FIG. 29C

| ROW ITEM OF USER'S VIEW | | | | | | | | |
|---|---|---|---|---|---|---|---|---|
| BUSINESS SERVICE CLASSI- FICATION | CYCLE | MANAGEMENT UNIT | SPECIFICATION /SUMMARY | USER'S VIEW NUMBER | GENERAL ATTRIBUTE NAME (VALUE) | CLASSIFYING ATTRIBUTE NAME | CATEGORY NAME | ... |
| BUSINESS SERVICE A | DAILY | BRANCH OFFICE | SUMMARY | 1 | TRANSACTION MONEY AMOUNT | — | — | ... |
| BUSINESS SERVICE A | DAILY | BRANCH OFFICE | SUMMARY | 1 | TRANSACTION MONEY AMOUNT | TRANSACTION CODE | TRANSACTIONS a THROUGH c | ... |
| . | . | . | . | . | . | . | . | ... |
| BUSINESS SERVICE A | DAILY | BRANCH OFFICE | SUMMARY | 2 | TRANSACTION MONEY AMOUNT | MONEY AMOUNT HIERARCHY CODE | 0 TO 5,000,000 YEN | ... |
| BUSINESS SERVICE A | DAILY | BRANCH OFFICE | SUMMARY | 2 | TRANSACTION MONEY AMOUNT | MONEY AMOUNT HIERARCHY CODE | 5,000,000 TO 10,000,000 YEN | ... |
| . | . | . | . | . | . | . | . | ... |

FIG. 29D

| COLUMN ITEM OF USR'S VIEW | | | | | | | |
|---|---|---|---|---|---|---|---|
| BUSINESS SERVICE CLASSI- FICATION | CYCLE | MANAGEMENT UNIT | SPECIFICATION /SUMMARY | USER'S VIEW NUMBER | CLASSIFYING ATTRIBUTE NAME | CATEGORY NAME | ... |
| BUSINESS SERVICE A | DAILY | BRANCH OFFICE | SUMMARY | 1 | INDUSTRIAL CLASSIFICATION CODE | MANUFACTURING INDUSTRY | ... |
| BUSINESS SERVICE A | DAILY | BRANCH OFFICE | SUMMARY | 1 | INDUSTRIAL CLASSIFICATION CODE | PRIMARY INDUSTRY | ... |
| . | . | . | . | . | . | . | ... |
| BUSINESS SERVICE A | DAILY | BRANCH OFFICE | SUMMARY | 2 | PRODUCT CODE | PRODUCT1 | ... |
| BUSINESS SERVICE A | DAILY | BRANCH OFFICE | SUMMARY | 2 | PRODUCT CODE | PRODUCT1 | ... |
| . | . | . | . | . | . | . | ... |

FIG. 30A

| EXTRACTION CONDITION | | | | | |
|---|---|---|---|---|---|
| BUSINESS SERVICE CLASSI FICATION | CYCLE | MANAGEMENT UNIT | SPECIFICATION /SUMMARY | EXTRACTION CONDITION EXPRESSION | ... |
| BUSINESS SERVICE A | DAILY | BRANCH OFFICE | SUMMARY | BRANCH OFFICE TYPE = "SERVICE SHOP DISPLAY" | ... |

FIG. 30B

| CODE CONVERSION | | | | | | | | |
|---|---|---|---|---|---|---|---|---|
| BUSINESS SERVICE CLASSI FICATION | CYCLE | MANAGEMENT UNIT | SPECIFICATION /SUMMARY | GENERAL ATTRIBUTE NAME | PRE-CONVERTED CLASSIFYING ATTRIBUTE/CODE | CONVERTED CLASSIFYING ATTRIBUTE /CODE | RANGE ALTERATION | ... |
| BUSINESS SERVICE A | DAILY | BRANCH OFFICE | SUMMARY | TRANSACTION MONEY AMOUNT | - | MONEY AMOUNT HIERARCHY CODE 0 TO 5,000,000 YEN | 0<, <500 | ... |
| BUSINESS SERVICE A | DAILY | BRANCH OFFICE | SUMMARY | TRANSACTION MONEY AMOUNT | - | MONEY AMOUNT HIERARCHY CODE 5,000,000 TO 10,000,000 YEN | 500<, <1000 | ... |
| BUSINESS SERVICE A | DAILY | BRANCH OFFICE | SUMMARY | TRANSACTION MONEY AMOUNT | - | MONEY AMOUNT HIERARCHY CODE MORE THAN 10,000,000 YEN | <1000 | ... |

FIG. 30C

| DERIVATION OPERATION | | | | | | | | |
|---|---|---|---|---|---|---|---|---|
| BUSINESS SERVICE CLASSIFICATION | CYCLE | MANAGEMENT UNIT | SPECIFICATION /SUMMARY | OPERATION UNIT ITEM | AGGREGATION UNIT ITEM | CONDITION EXPRESSION | DERIVATION OPERATION EXPRESSION | ... |
| BUSINESS SERVICE A | DAILY | BRANCH OFFICE | SUMMARY | - | - | - | SERVICE CHARGE=TRANSACTION MONEY AMOUNT × 0.05 | ... |

FIG. 31

| GROUP OPERATION (CORRESPONDING TO CLASSIFICATION DISPLAY) | | | | | | | | |
|---|---|---|---|---|---|---|---|---|
| BUSINESS SERVICE CLASSIFICATION | CYCLE | MANAGEMENT UNIT | SPECIFICATION /SUMMARY | DISPLAY DATA ITEM NAME | SET DATA ITEM NAME | SET VALUE | SET CONTENTS | ... |
| BUSINESS SERVICE A | DAILY | BRANCH OFFICE | SUMMARY | EAST JAPAN DISPLAY | BRANCH OFFICE NUMBER | 100 | EAST JAPAN | ... |
| BUSINESS SERVICE A | DAILY | BRANCH OFFICE | SUMMARY | WEST JAPAN DISPLAY | BRANCH OFFICE NUMBER | 101 | WEST JAPAN | ... |

FIG. 32A

| CUSTOMER TABLE | | | | | |
|---|---|---|---|---|---|
| CUSTOMER NUMBER | NAME | PARENT-CUSTOMER NUMBER | GROUP NUMBER | MONEY AMOUNT | ... |
| 001 | XXX | - | A010 | 30 | ... |
| 002 | ○○ | 001 | A010 | 40 | ... |
| 003 | △△ | 001 | B021 | 10 | ... |
| 004 | □□ | 002 | B021 | 5 | ... |
| 005 | ◇◇ | - | B021 | 20 | ... |

FIG. 32B

| GROUP REPRESENTATIVE CUSTOMER TABLE | | |
|---|---|---|
| REPRESENTATIVE CUSTOMER NUMBER | GROUP NUMBER | ... |
| 001 | A010 | ... |
| 003 | B021 | ... |

FIG. 32C

| OUTPUT DATA | | | |
|---|---|---|---|
| CUSTOMER NUMBER | PARENT-CHILD CLASSIFICATION | ... | MONEY AMOUNT |
| 001 | 0 | ... | 30 |
| 001 | 1 | ... | 80 |
| 001 | 2 | ... | 70 |
| 002 | 0 | ... | 40 |
| 002 | 1 | ... | 45 |
| 003 | 0 | ... | 10 |
| 003 | 2 | ... | 35 |
| 004 | 0 | ... | 5 |
| 005 | 0 | ... | 20 |

FIG. 33

| GROUP OPERATION (CORRESPONDING TO PARENT-CHILD) | | | | | | | | |
|---|---|---|---|---|---|---|---|---|
| BUSINESS SERVICE CLASSIFICATION | CYCLE | MANAGEMENT UNIT | SPECIFICATION /SUMMARY | PARENT ITEM NAME | CHILD ITEM NAME | GROUP ITEM NAME | PARENT-CHILD CLASSIFICATION ITEM NAME | ... |
| BUSINESS SERVICE A | DAILY | CUSTOMER | SUMMARY | PARENT-CUSTOMER NUMBER | CUSTOMER NUMBER | GROUP NUMBER | PARENT-CHILD CLASSIFICATION | ... |

FIG. 34A

| PAST DATA ACQUISITION INFORMATION | | | | | | |
|---|---|---|---|---|---|---|
| BUSINESS SERVICE CLASSIFICATION | CYCLE | MANAGEMENT UNIT | SPECIFICATION /SUMMARY | TIME POINT CLASSIFICATION | VALUE ITEM NAME | ... |
| BUSINESS SERVICE A | DAILY | BRANCH OFFICE | SUMMARY | PREVIOUS DAY | TRANSACTION MONEY AMOUNT | ... |

FIG. 34B

| COMPARISON VALUE OPERATION INFORMATION | | | | | | | |
|---|---|---|---|---|---|---|---|
| BUSINESS SERVICE CLASSIFICATION | CYCLE | MANAGEMENT UNIT | SPECIFICATION /SUMMARY | TIME POINT CLASSIFICATION | COMPARISON CLASSIFICATION | VALUE ITEM NAME | ... |
| BUSINESS SERVICE A | DAILY | BRANCH OFFICE | SUMMARY | PREVIOUS DAY | COMPARISON WITH END OF PREVIOUS MONTH | TRANSACTION MONEY AMOUNT | ... |

FIG. 34C

| PAST DATA CORRECTION INFORMATION | | | | | | |
|---|---|---|---|---|---|---|
| BUSINESS SERVICE CLASSIFICATION | CYCLE | MANAGEMENT UNIT | SPECIFICATION /SUMMARY | CORRECTION CLASSIFICATION | VALUE ITEM NAME | ... |
| BUSINESS SERVICE A | DAILY | BRANCH OFFICE | SUMMARY | RETROACTIVE CORRECTION | TRANSACTION MONEY AMOUNT | ... |

FIG. 34D

| TIME SERIES HOLDING PERIOD INFORMATION | | | | | |
|---|---|---|---|---|---|
| BUSINESS SERVICE CLASSIFICATION | CYCLE | MANAGEMENT UNIT | SPECIFICATION /SUMMARY | HOLDING PERIOD | ... |
| BUSINESS SERVICE A | DAILY | BRANCH OFFICE | SUMMARY | 30 DAYS | ... |

FIG. 35A

| INTERFACE (INFORMATION ON INPUT AND OUTPUT BUFFER) | | | | | | | |
|---|---|---|---|---|---|---|---|
| BUSINESS SERVICE CLASSIFICATION | CYCLE | MANAGEMENT UNIT | SPECIFICATION /SUMMARY | TASK CONTENTS | PROCESSING CONTENTS | DATA ITEM NAME | ... |
| BUSINESS SERVICE A | DAILY | BRANCH OFFICE | SUMMARY | CATEGORY OPERATION | INPUT | BRANCH OFFICE NUMBER | ... |
| BUSINESS SERVICE A | DAILY | BRANCH OFFICE | SUMMARY | CATEGORY OPERATION | . | . | ... |
| . | . | . | . | . | . | . | ... |
| BUSINESS SERVICE A | DAILY | BRANCH OFFICE | SUMMARY | CATEGORY OPERATION | CONDITION JUDGMENT | BRANCH OFFICE NUMBER | ... |
| BUSINESS SERVICE A | DAILY | BRANCH OFFICE | SUMMARY | CATEGORY OPERATION | . | . | ... |
| . | . | . | . | . | . | . | ... |
| BUSINESS SERVICE A | DAILY | BRANCH OFFICE | SUMMARY | GROUP OPERATION | INPUT | BRANCH OFFICE NUMBER | ... |
| . | . | | . | . | . | . | ... |
| BUSINESS SERVICE A | DAILY | BRANCH OFFICE | SUMMARY | TIME SERIES OPERATION | INPUT | BRANCH OFFICE NUMBER | ... |
| . | . | | . | . | . | . | ... |

FIG. 35B

| COUNTING AREA (CLASSIFYING ATTRIBUTE INFORMATION OF COUNTING BUFFER) | | | | | | | | |
|---|---|---|---|---|---|---|---|---|
| BUSINESS SERVICE CLASSIFICATION | CYCLE | MANAGEMENT UNIT | SPECIFICATION /SUMMARY | CLASSIFYING ATTRIBUTE NAME | CATEGORY NAME | SET NUMBER | VALUE ITEM NUMBER | ... |
| BUSINESS SERVICE A | DAILY | BRANCH OFFICE | SUMMARY | INDUSTRIAL CLASSIFICATION CODE | MANUFACTURING INDUSTRY | 1 | 1 | ... |
| BUSINESS SERVICE A | DAILY | BRANCH OFFICE | SUMMARY | INDUSTRIAL CLASSIFICATION CODE | MANUFACTURING INDUSTRY | 2 | 1 | ... |
| BUSINESS SERVICE A | DAILY | BRANCH OFFICE | SUMMARY | TRANSACTION CODE | TRANSACTIONS a THROUGH c | 2 | 1 | ... |
| . | . | . | . | . | . | . | . | ... |
| BUSINESS SERVICE A | DAILY | BRANCH OFFICE | SUMMARY | INDUSTRIAL CLASSIFICATION CODE | MANUFACTURING INDUSTRY | 5 | 2 | ... |
| BUSINESS SERVICE A | DAILY | BRANCH OFFICE | SUMMARY | PRODUCT CODE | TYPE-B PRODUCT | 5 | 2 | ... |
| . | . | . | . | . | . | . | . | ... |

FIG. 36A

| COUNTING AREA (VALUE ITEM INFORMATION OF COUNTING BUFFER) | | | | | | |
|---|---|---|---|---|---|---|
| BUSINESS SERVICE CLASSIFICATION | CYCLE | MANAGEMENT UNIT | SPECIFICATION /SUMMARY | VALUE ITEM NUMBER | VAUE ITEM NAME | ... |
| BUSINESS SERVICE A | DAILY | BRANCH OFFICE | SUMMARY | 1 | TRANSACTION MONEY AMOUNT | ... |
| BUSINESS SERVICE A | DAILY | BRANCH OFFICE | SUMMARY | 2 | SEVICE CHARGE | ... |
| . | . | . | . | . | . | ... |

FIG. 36B

| DATA STRUCTURE TRANSFORMATION (INFORMATION ON LINK BETWEEN COUNTING BUFFER AND OUTPUT BUFFER) | | | | | | | | | |
|---|---|---|---|---|---|---|---|---|---|
| BUSINESS SERVICE CLASSIFICATION | CYCLE | MANAGEMENT UNIT | SPECIFICATION /SUMMARY | SET NUMBER | VALUE ITEM NUMBER | USER'S VIEW NUMBER | ROW ITEM | COLUMN ITEM | ... |
| BUSINESS SERVICE A | DAILY | BRANCH OFFICE | SUMMARY | 1 | 1 | 1 | 1 | 1 | ... |
| BUSINESS SERVICE A | DAILY | BRANCH OFFICE | SUMMARY | 2 | 1 | 1 | 1 | 2 | ... |
| . | . | . | . | 3 | 1 | 1 | 1 | 3 | ... |
| BUSINESS SERVICE A | DAILY | BRANCH OFFICE | SUMMARY | . | . | . | . | . | ... |
| BUSINESS SERVICE A | DAILY | BRANCH OFFICE | SUMMARY | 5 | 2 | 1 | 1 | 4 | ... |
| . | . | . | . | 6 | 1 | 1 | 2 | 1 | ... |
| BUSINESS SERVICE A | DAILY | BRANCH OFFICE | SUMMARY | . | . | . | . | . | ... |
| . | . | . | . | n | 1 | 2 | 1 | 1 | ... |
| BUSINESS SERVICE A | DAILY | BRANCH OFFICE | SUMMARY | n+1 | 1 | 2 | 1 | 2 | ... |
| . | . | . | . | . | . | . | . | . | ... |

F I G. 3 8

| DATE | BRANCH OFFICE NUMBER | INDUSTRIAL CLASSIFICATION CODE | AREA CODE | COMPANY SIZE CODE | TRANSACTION CODE | PRODUCT CODE | MONEY AMOUNT HIERARCHY CODE | TRANSACTION MONEY AMOUNT | SERVICE CHARGE |
|---|---|---|---|---|---|---|---|---|---|
| xxx | xxx | MANUFACTURING INDUSTRY | - | - | - | - | - | xxx x | - |
| xxx | xxx | MANUFACTURING INDUSTRY | - | - | TRANSACTIONS a THROUGH c | - | - | xxx x | - |
| . | . | . | . | . | . | . | . | . | . |
| xxx | xxx | PRIMARY INDUSTRY | - | - | - | - | - | xxx x | - |
| xxx | xxx | PRIMARY INDUSTRY | - | - | TRANSACTIONS a THROUGH c | - | - | xxx x | - |
| . | . | . | . | . | . | . | . | . | . |
| xxx | xxx | - | TOKYO | LARGE COMPANY | - | - | - | xxx x | - |
| xxx | xxx | - | TOKYO | LARGE COMPANY | TRANSACTIONS a THROUGH c | - | - | xxx x | - |
| . | . | . | . | . | . | . | . | . | . |
| xxx | xxx | - | - | - | - | PRODUCT 1 | 0 TO 5,000,000 YEN | xxx x | - |
| . | . | . | . | . | . | . | . | . | . |

FIG. 39

| DATE | BRANCH OFFICE NUMBER | INDUSTRIAL CLASSIFICATION CODE | AREA CODE | COMPANY SIZE CODE | TRANSACTION CODE | PRODUCT CODE | MONEY AMOUNT HIERARCHY CODE | TRANSACTION MONEY AMOUNT | SERVICE CHARGE |
|---|---|---|---|---|---|---|---|---|---|
| XXX | XXX | MANUFACTURING INDUSTRY | - | - | - | - | - | XXXXXX | - |
| XXX | XXX | MANUFACTURING INDUSTRY | - | - | TRANSACTIONS a THROUGH c | - | - | XXXXXX | - |
| . | . | . | . | . | . | . | . | . | . |
| XXX | XXX | PRIMARY INDUSTRY | - | - | - | - | - | XXXXXX | - |
| XXX | XXX | PRIMARY INDUSTRY | - | - | TRANSACTIONS a THROUGH c | - | - | XXXXXX | - |
| . | . | . | . | . | . | . | . | . | . |
| XXX | XXX | - | TOKYO | LARGE COMPANY | - | - | - | XXXXXX | - |
| XXX | XXX | - | TOKYO | LARGE COMPANY | TRANSACTIONS a THROUGH c | - | - | XXXXXX | - |
| . | . | . | . | . | . | . | . | . | . |
| XXX | XXX | - | - | - | - | PRODUCT 1 | 0 TO 5,000,000 YEN | XXXXXX | - |
| . | . | . | . | . | . | . | . | . | . |
| XXX | 100 | MANUFACTURING INDUSTRY | - | - | - | - | - | XXXXXX | - |
| . | . | . | . | . | . | . | . | . | . |
| XXX | 101 | MANUFACTURING INDUSTRY | - | - | - | - | - | XXXXXX | - |

FIG. 40

| DATE | BRANCH OFFICE NUMBER | BRANCH OFFICE NAME | INDUSTRIAL CLASSIFICATION CODE | AREA CODE | COMPANY SIZE CODE | TRANSACTION MONEY AMOUNT | TRANSACTION MONEY AMOUNTS a THROUGH c | TRANSACTION MONEY AMOUNTS d AND e | TYPE-A PRODUCT TRANSACTION MONEY AMOUNT | TYPE-B PRODUCT SERVICE CHARGE |
|---|---|---|---|---|---|---|---|---|---|---|
| XXXX | XXXX | XXXX | MANUFACTURING INDUSTRY | - | - | XXXX | XXXX | XXXX | XXXX | XXXX |
| XXXX | XXXX | XXXX | PRIMARY INDUSTRY | - | - | XXXX | XXXX | XXXX | XXXX | XXXX |
| XXXX | XXXX | XXXX | SECONDARY INDUSTRY | - | - | XXXX | XXXX | XXXX | XXXX | XXXX |
| XXXX | XXXX | XXXX | TERTIARY INDUSTRY | - | - | XXXX | XXXX | XXXX | XXXX | XXXX |
| XXXX | XXXX | XXXX | - | TOKYO | LARGE COMPANY | XXXX | XXXX | XXXX | XXXX | XXXX |
| XXXX | XXXX | XXXX | | - | MEDIUM AND SMALL COMPANY | XXXX | XXXX | XXXX | XXXX | XXXX |
| XXXX | XXXX | XXXX | - | - | - | XXXX | XXXX | XXXX | XXXX | XXXX |
| . | . | . | . | . | . | . | . | . | . | . |

FIG. 41

| DATE | BRANCH OFFICE NUMBER | BRANCH OFFICE NAME | PRODUCT CODE | COMPANY SIZE CODE | TRANSACTION MONEY AMOUNT FROM 0 TO 5,000,000 YEN | TRANSACTION MONEY AMOUNT FROM 5,000,000 TO 10,000,000 YEN | TRANSACTION MONEY AMOUNT MORE THAN 10,000,000 YEN | PREVIOUS DAY'S TRANSACTION MONEY AMOUNT | COMPARISON OF PREVIOUS DAY'S TRANSACTION MONEY AMOUNT WITH THAT OF END OF PREVIOUS MONTH |
|---|---|---|---|---|---|---|---|---|---|
| XXXX | XXXX | XXXX | PRODUCT 1 | - | XXXX | XXXX | XXXX | XXXX | XXXX |
| XXXX | XXXX | XXXX | PRODUCT 2 | - | XXXX | XXXX | XXXX | XXXX | XXXX |
| XXXX | XXXX | XXXX | PRODUCT 3 | - | XXXX | XXXX | XXXX | XXXX | XXXX |
| XXXX | XXXX | XXXX | PRODUCT 4 | - | XXXX | XXXX | XXXX | XXXX | XXXX |
| XXXX | XXXX | XXXX | PRODUCT 5 | - | XXXX | XXXX | XXXX | XXXX | XXXX |
| XXXX | XXXX | XXXX | | MEDIUM AND SMALL COMPANY | XXXX | XXXX | XXXX | XXXX | XXXX |
| XXXX | XXXX | XXXX | - | - | XXXX | XXXX | XXXX | XXXX | XXXX |
| . | . | . | . | . | . | . | . | . | . |

BATCH PROCESSING APPARATUS

TECHNICAL FIELD

This invention relates to a batch processing apparatus, a batch processing method, a batch processing program, and a batch processing system for creating desired output data based on arbitrary input data.

BACKGROUND ART

Various types of information-processing systems using information processors have been developed in association with recent widespread use and greater sophistication of information processors such as personal computers and the like. There has been provided a system for performing a so-called batch process, as one of those information-processing systems.

The batch process is generally such a processing model that creates desired output data by automatically sequentially processing input data defined as a source, on the condition that a series of procedural steps is preliminarily designed for operation composed of one or more processes, and is effective in collecting and processing a large amount of data, in such cases as performing tabulation processes on sales data at companies, for example. One or more processes are required to execute this batch process, in which each process is executed in accordance with input information, processing operation contents, and output information described in a program for carrying out each process. To construct the information-processing system for performing the batch process, therefore, the input and output data in each process are specified in their formats or the like to design the processing operation contents between the input and output data on the condition that a process flow is designed with consideration to the interrelationship between respective processes. In order to construct the information-processing system for performing the batch process a program is to be developed that achieves the function of actualizing the processing operation contents.

There has been provided the information-processing system for performing the aforementioned batch process, which automatically creates a program for executing a predetermined processing operation using a so-called Structured Query Language (SQL) or the like on the condition that the process flow is designed to specify the input and output data of each process.

There has also been provided the information-processing system, which creates a program for wider variety of uses by inputting external parameters as constant information to be included in a part of the program in order to construct a process for a wide variety of applications.

Patent Document 1 (Japanese Patent Laid-Open No. 2001-60150), Patent Document 2 (Japanese Patent Laid-Open No. H11-175327), and the like are instantiated as specific examples of the information-processing system.

In addition, there have been such cases in which using the aforementioned conventional information-processing system for executing the predetermined processing operation has resulted in the inability to create a program for fulfilling the function of the processing operation contents due to limitation of the processing operation contents executed by the single process. The conventional information-processing system as described above may occasionally require the processing operation be performed through many processes so as to fulfill the function for executing the processing operation contents, whereby intermediate data transferred in the single process or between the processes increase in this case, thereby leading to problems such as an increase of development cost, system risk after development, and processing time. Therefore, the fact is that the conventional information-processing system necessitates development of a program specialized for individual applications.

The external parameter is individually assigned to each single process in the aforementioned conventional information-processing system in which the external parameters are input as constant information to be included in a part of the program. Thus, in the case of a change of data items, processing operation contents, and the like in this type of conventional information-processing system, the changes are not transmitted to all of the related processes, thereby not automatically changing all of the output data.

As described above, the conventional information-processing system requires development of a program specialized for individual applications, and all of the output data are not automatically changed according to change of the data item, the processing operation contents, and the like.

Furthermore, such problems as described below have arisen in performing the batch process as the information-processing system becomes bloated in scale and complicated in an information society over recent years.

The first problem is that an appropriate design principle for a process flow is not formulated to lead the process flow and the output and input data to become larger and more complicated, in other words, to lead to process and data jumbles.

The second problem is that an information processor is required, which has a large capacity and high speed, to use a method for intermediately creating direct product data.

Furthermore, the third problem is that a large number of similar items and synonymous items occur in association with the increase of the data items to be handled, thereby making it difficult to make a determination as to which data to use for which processes.

Yet further, the fourth problem is that these factors result in a remarkable increase of the burden on a system designer, a system administrator, and an operator operating the system, at the time when the program is increased or changed.

In performing the batch process, there has been apprehension that these problems are responsible for a noticeable increase in the development and maintenance costs as well as degradation of quality.

DISCLOSURE OF THE INVENTION

This invention is accomplished in consideration of the above situation, and it is an object of the invention to provide a batch processing apparatus, a batch processing method, a batch processing program, and a batch processing system cable of creating desired output data based on arbitrary input data, with low cost and uncomplicated work.

According to this invention for achieving the aforementioned objects, a batch processing apparatus for creating desired output data based on arbitrary input data includes a metadata acquisition section for acquiring from a predetermined memorizing section, metadata defined as information concerning at least data item name, input, processing operation content, and output, as well as information previously stored in the memorizing section, a data input section for inputting the input data based on a declaration process of the metadata acquired through the metadata acquisition section, a processing section for creating the output data by processing the input data input through the data input section, based on the declaration process of the metadata acquired through the metadata acquisition section, and a data output section for outputting the output data created by the processing section, based on the declaration process of the metadata acquired through the metadata acquisition section, wherein the processing section changes and creates all of the output data related to the metadata, according to change of the metadata.

According to this invention for achieving the aforementioned objects, a batch processing method for creating desired output data based on arbitrary input data includes a metadata acquisition step for acquiring from a predetermined memorizing section, metadata defined as information concerning at least data item name, input, a processing operation content, and output, as well as information previously stored in the memorizing section, a data input step for inputting the input data based on a declaration process of the metadata acquired at the metadata acquisition step, a processing step for creating the output data by processing the input data input at the data input step, based on the declaration process of the metadata acquired at the metadata acquisition step, and a data output step for outputting the output data created at the processing step, based on the declaration process of the metadata acquired at the metadata acquisition step, wherein all of the output data related to the metadata are changed and created according to change of the metadata at the processing step.

According to this invention for achieving the aforementioned objects, a batch processing program executable with a computer, for creating desired output data based on arbitrary input data includes a metadata acquisition process for acquiring from a predetermined memorizing section, metadata defined as information concerning at least data item name, input, a processing operation content, and output, as well as information previously stored in the memorizing section, a data input process for inputting the input data based on a declaration process of the metadata acquired in the metadata acquisition process, a processing process for creating the output data by processing the input data input in the data input process, based on the declaration process of the metadata acquired in the metadata acquisition process, and a data output process for outputting the output data created in the processing process, based on the declaration process of the metadata acquired in the metadata acquisition process, wherein all of the output data related to the metadata are changed and created according to change of the metadata in the processing process.

According to this invention, a batch processing system for creating desired output data based on arbitrary input data includes a memorizing device for previously memorizing and registering metadata defined as information concerning at least data item name, input, a processing operation content, and output, a first operating device for creating the metadata based on a predetermined specification, registering the created metadata in the memorizing device, a processing device for acquiring the metadata from the memorizing device, inputting the input data based on a declaration process of the acquired metadata, creating the output data by processing the input data already input, and outputting the output data, and a second operating device for giving at least a start instruction of a batch process to the processing apparatus, wherein the processing apparatus changes and creates the output data related to the metadata according to change of the metadata.

The batch processing apparatus according to this invention, the batch processing method, and the batch processing system respectively creates by changing all of output data related to metadata according to change of the metadata, based on a declaration process of the metadata as information previously registered, at the time of creating the output data by processing input data. Accordingly, each of the batch processing apparatus, the batch processing program, and the batch processing system can remarkably reduce a burden on a system designer, a system administrator, and an operator operating the system as well as development cost.

BRIEF DESCRIPTION OF THE DRAWINGS

FIG. 7 is a view illustrating a process flow and a structure of the operation processing unit in the batch processing apparatus;

FIG. 9 is a view illustrating a structure of a summary operation processing unit installed in the operation processing unit and contents of metadata;

FIG. 17A is a view showing a specification example of input data, i.e., showing contents of a branch office table;

FIG. 17B is a view showing a specification example of input data, i.e., showing contents of a customer table;

FIG. 17C is a view showing a specification example of input data, i.e., showing contents of a transaction table;

FIG. 18 is a view showing a specification example of a first user's view;

FIG. 19 is a view showing a specification example of a second user's view;

FIG. 20 is a view showing a specification example of an industrial classification code;

FIG. 21 is a view showing a specification example of an area code;

FIG. 22 is a view showing a specification example of a product code;

FIG. 23 is a view showing a specification example of a transaction code;

FIG. 24 is a view showing a specification example of a company size code;

FIG. 25 is a view showing a specification example of a money amount hierarchy code;

FIG. 26 is a view showing a specification example of a branch office table for display of parent-child data;

FIG. 27A is a view showing a specific example of data dictionary metadata as metadata identifying data item name, i.e., showing contents of general attribute information;

FIG. 27B is a view showing a specific example of data dictionary metadata as metadata identifying data item name, i.e., showing contents of classifying attribute information;

FIG. 27C is a view showing a specific example of data dictionary metadata as metadata identifying data item name, i.e., showing contents of category information;

FIG. 27D is a view showing a specific example of data dictionary metadata as metadata identifying data item name, i.e., showing contents of a category hierarchy information;

FIG. 28A is a view showing a specific example of input and output information metadata as metadata identifying input and output, i.e., showing contents of a file list;

FIG. 28B is a view showing a specific example of input and output information metadata as metadata identifying input and output, i.e., showing contents of a schema about a file;

FIG. 28C is a view showing a specific example of input and output information metadata as metadata identifying input and output, i.e., showing contents of a management unit;

FIG. 28D is a view showing a specific example of input and output information metadata as metadata identifying input and output, i.e., showing contents of a list of files used in each process;

FIG. 28E is a view showing a specific example of input and output information metadata as metadata identifying input and output, i.e., showing contents of a relation list of files used in each process;

FIG. 29A is a view showing a specific example of user's view information metadata as metadata identifying a user's view intended to be output, i.e., showing contents of names of the user's view;

FIG. 29B is a view showing a specific example of user's view information metadata as metadata identifying a user's view intended to be output, i.e., showing contents of heading items of the user's view;

FIG. 29C is a view showing a specific example of user's view information metadata as metadata identifying a user's view intended to be output, i.e., showing contents of row items of the user's view;

FIG. 29D is a view showing a specific example of user's view information metadata as metadata identifying a user's view intended to be output, i.e., showing contents of column items of the user's view;

FIG. 30A is a view showing a specific example of extraction condition metadata, code conversion metadata, and derivation operation metadata as metadata identifying processing operation contents, i.e., showing contents of the extraction condition metadata;

FIG. 30B is a view showing a specific example of extraction condition metadata, code conversion metadata, and derivation operation metadata as metadata identifying processing operation contents, i.e., showing contents of the code conversion metadata;

FIG. 30C is a view showing a specific example of extraction condition metadata, code conversion metadata, and derivation operation metadata as metadata identifying processing operation contents, i.e., showing contents of the derivation operation metadata;

FIG. 31 is a view showing a specific example of group operation metadata corresponding to a classified display as metadata identifying processing operation contents;

FIG. 32A is a view showing a specification example of input data different from the input data shown in FIG. 17A through FIG. 17C, and output data different from the output data shown in FIG. 18 and FIG. 19, i.e., showing contents of a customer table;

FIG. 32B is a view showing a specification example of input data different from the input data shown in FIG. 17A to FIG. 17C, and output data different from the output data shown in FIG. 18 and FIG. 19, i.e., showing contents of a group representative customer table;

FIG. 32C is a view showing a specification example of input data different from the input data shown in FIG. 17A through FIG. 17C, and output data different from the output data shown in FIG. 18 and FIG. 19, i.e., showing contents of output data;

FIG. 33 is a view showing a specific example of group operation metadata corresponding to a parent-child relationship as metadata identifying processing operation contents;

FIG. 34A is a view showing a specific example of time series operation metadata as metadata identifying processing operation contents, i.e., showing contents of past data acquisition information;

FIG. 34B is a view showing a specific example of time series operation metadata as metadata identifying processing operation contents, i.e., showing contents of comparison value operation information;

FIG. 34C is a view showing a specific example of time series operation metadata as metadata identifying processing operation contents, i.e., showing contents of past data correction information;

FIG. 34D is a view showing a specific example of time series operation metadata as metadata identifying processing operation contents, i.e., showing contents of time-series holding period information;

FIG. 35A is a view showing a specific example of metadata created based on various metadata shown in FIG. 28A through FIG. 28E, FIG. 29A through FIG. 29D, FIG. 30A through FIG. 30C, FIG. 31, and FIG. 34A through FIG. 34D, i.e., showing contents of interface metadata;

FIG. 35B is a view showing a specific example of metadata created based on various metadata shown in FIG. 28A through FIG. 28E, FIG. 29A through FIG. 29D, FIG. 30A through FIG. 30C, FIG. 31, and FIG. 34A through FIG. 34D, i.e., showing contents of calculation area metadata indicative of class attribute information of a calculation buffer;

FIG. 36A is a view showing a specific example of metadata created based on various metadata shown in FIG. 28A through FIG. 28E, FIG. 29A through FIG. 29D, FIG. 30A through FIG. 30C, FIG. 31, and FIG. 34A through FIG. 34D, i.e., showing contents of calculation area metadata indicative of value item information;

FIG. 36B is a view showing a specific example of metadata created based on various metadata shown in FIG. 28A through FIG. 28E, FIG. 29A through FIG. 29D, FIG. 30A through FIG. 30C, FIG. 31, and FIG. 34A through FIG. 34D, i.e., showing contents of data structure transformation metadata;

FIG. 38 is a view showing a specific example of a first intermediate table;

FIG. 39 is a view showing a specific example of a second intermediate table;

FIG. 40 is a view showing a specific example of a first output table as output data; and FIG. 41 is a view showing a specific example of a second output table as output data.

BEST MODE FOR CARRYING OUT THE INVENTION

Hereinafter, with reference to the drawings, specified embodiments to which the present invention is applied are described in detail.

The embodiments are about a batch processing apparatus for creating desired output data based on arbitrary input data. In this batch processing apparatus, a batch process is performed in accordance with a metadata declaration on the condition that at least information concerning "data item name", "input", "processing operation contents", and "output" is previously registered as metadata in a predetermined repository, and the output data are created by processing the input data based on a declaration process of the registered metadata.

Especially, the batch processing apparatus establishes a process for automatically changing all of the output data related to the metadata according to the change of the metadata while establishing a non-programming method based on the declaration process of the metadata. The batch processing apparatus has such functions as registering the metadata and unifying management of the registered metadata, as necessary for the execution of these processes as described above, and furthermore produces newly as the metadata upon process execution, a process flow necessary for creating the desired output data and contents of intermediate data created in each process, based on the registered contents of the metadata. By registering the process flow and the contents of the intermediate data, the batch processing apparatus achieves creation of the desired output data based on the input data as a source, only upon registration of the necessary metadata.

Explained first is the metadata to be registered in the batch processing apparatus described as the embodiment of this invention.

In the batch process, the output data are generally acquired by executing a predetermined processing operation such as various types of set operations on the data containing a hierarchical structure expressed in a table format to be managed based on a relational data model such as a so-called RDBMS (Relational DataBase Management System), for example.

Figure 1:
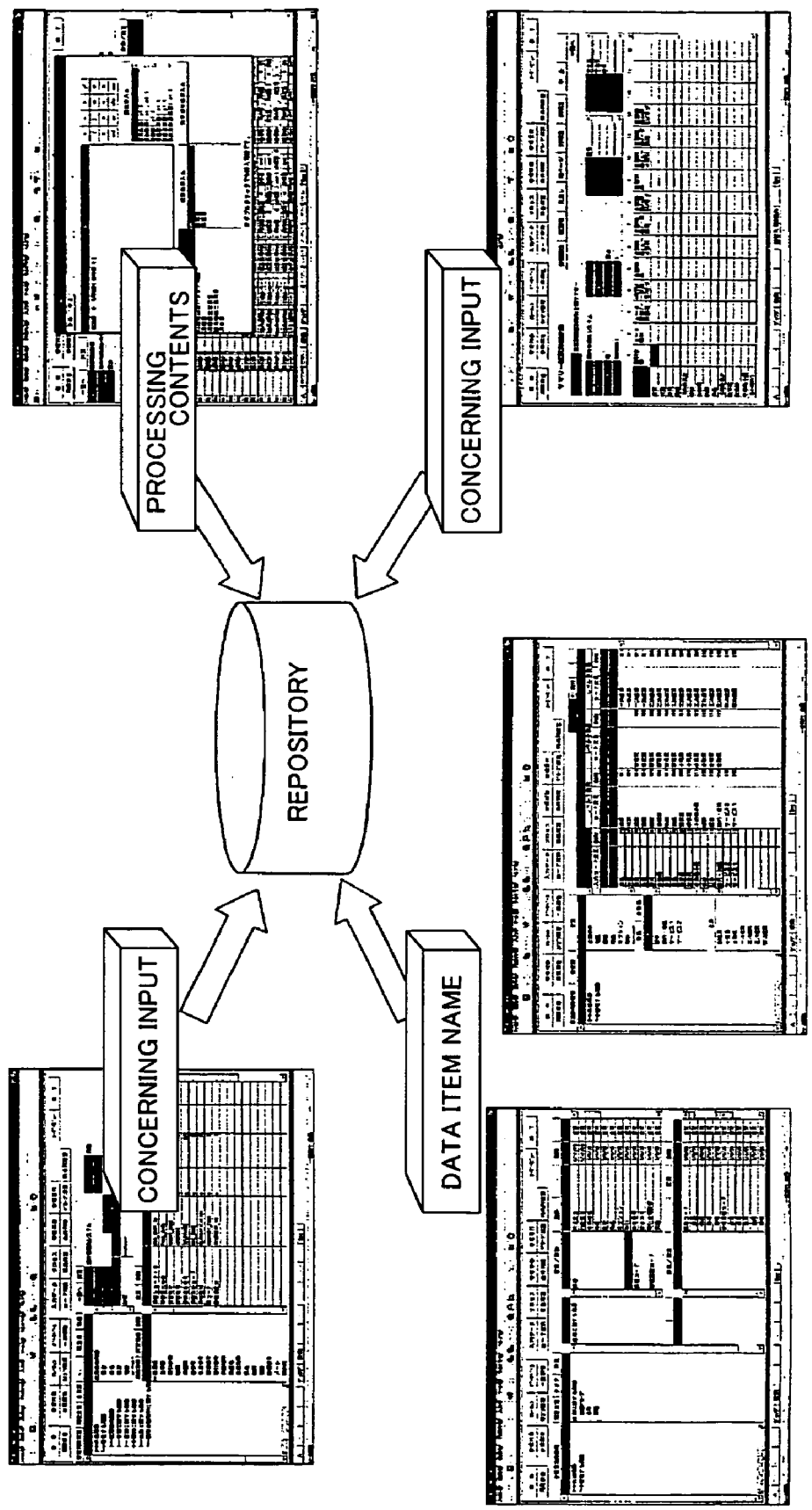
FIG. 1 is a view illustrating metadata to be registered in a batch processing apparatus according to an embodiment of this invention.

To achieve the objective, the information concerning "data item name", "input", "a processing operation contents", and "output" is previously registered as metadata in a predetermined repository in this batch processing apparatus described as the embodiment of this invention, as shown in FIG. 1.

Herein, the metadata identifying "data item name" defines a category name in a case where the data item name or the data item contains a code (category). The metadata identifying "input" defines the input data, i.e., a managed object, and indicates each code or the like other than a format of the input data in a case where the data item contains a code. Furthermore, the metadata identifying "a processing operation contents" defines an extraction condition expression for extracting the input data corresponding to a processing object, a derivation operation expression for expressing the output data derived according to the data item of the input data, or the like, and defines an operation between multiple records, i.e., between rows, other than each data item, i.e., an operation between columns. Yet further, the metadata identifying "output" defines the output data and indicates the data item, the format, and the like of the output data. It is to be noted that specific examples of those metadata are described later.

The batch processing apparatus performs various types of processes according to the metadata upon acquisition of those various kinds of metadata from the repository.

The batch processing apparatus newly produces as the metadata such information as, e.g., information indicating the process flow of the batch process, contents of the intermediate data such as a format of the intermediate data created in each process, information concerning a link between the input data and the output data in each process, and the like, thereby registering the information in the repository.

Thus, the batch processing apparatus executes each process in accordance with the processes to be executed, registered in the repository, start timings of the processes, and the process execution order. In this situation, to create the desired output data, the batch processing apparatus starts each of the processes sequentially in accordance with the process flow in a manner to start the subsequent process upon completion of the previous process.

Hereinafter, the batch processing apparatus operated based on this type of metadata declaration is explained in detail.

Figure 2:
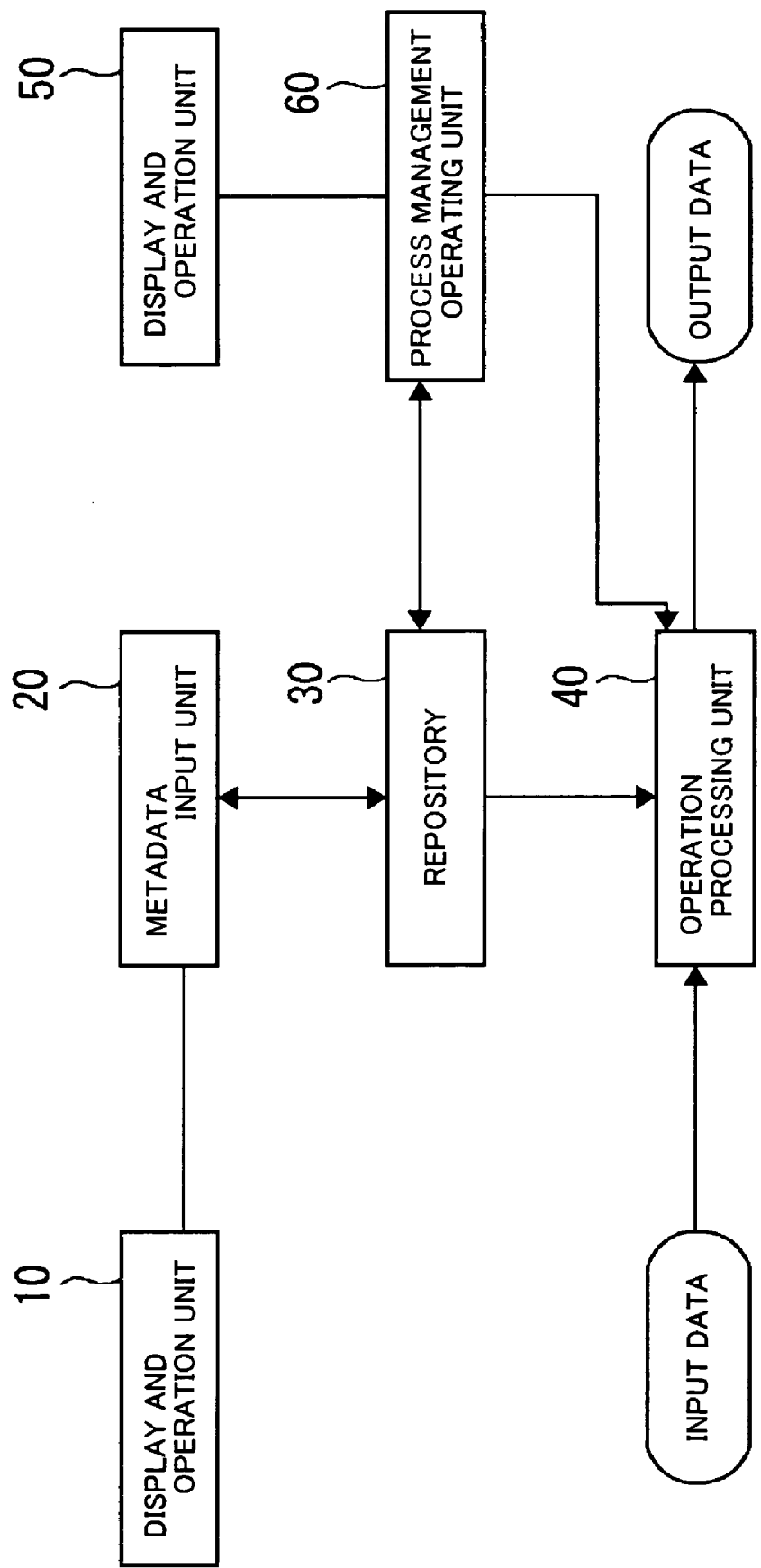
FIG. 2 is a block diagram illustrating a structure of the batch processing apparatus.

As shown in FIG. 2, the batch processing apparatus has a display and operation unit 10 through which a user specification is input, a metadata input unit 20 for producing and registering a repository 30, the metadata based on the user specification created through the display and operation unit 10, the repository 30 for memorizing the metadata, an operation processing unit 40 for executing various types of operation processes based on the metadata stored and registered in the repository 30, a display and operation unit 50 used for controlling process operation, and a process management operating unit 60 for controlling the process operation. In addition, the display and operation units 10, 50 are respectively shown as separated units in FIG. 2 but may be configured as a common unit in a case where the batch processing apparatus is configured with a single computer or the like.

The display and operation unit 10 is configured as a user interface, for example, a display device such as an LCD (Liquid Crystal Display), or an operation device such as a keyboard, a mouse, or the like. With the batch processing apparatus, a system designer or a system administrator displays and changes through the display and operation unit 10 the user specification such as a specification of the input and output data or a specification of the processing operation contents. The information input through the display and operation unit 10 is supplied to the metadata input unit 20.

The metadata input unit 20 produces the metadata based on the user specification input through the display and operation unit 10 and also functions as an interface to store and register the produced metadata in the repository 30. The metadata are supplied to the repository 30 through the metadata input unit 20. Furthermore, the metadata input unit 20 newly produces based on the metadata stored in the repository 30, the information concerning the process flow of the batch process, the contents of the intermediate data such as a format of the intermediate data created in each process, the information concerning the link between the input data and the output data in each process, or the like, thereby registering those data in the repository.

The repository 30 is created on a predetermined external storage device such as a hard disk or a device having a RAID (Redundant Arrays of Independent (Inexpensive) Disks) structure using multiple hard disks. The repository 30 memorizes and registers the metadata supplied from the metadata input unit 20. The metadata registered in the repository 30 are read out under control of the process management operating unit 60, thereby being supplied to the operation processing unit 40. The metadata registered in the repository 30 are read out by the metadata input unit 20 as well.

The operation processing unit 40 is configured with multiple processing units, which will be described later. The operation processing unit 40 acquires the metadata from the repository upon reception of a control signal indicative of a batch process starting instruction from the process management operating unit 60, inputs based on the declaration process of the metadata one or more input data stored in the predetermined external storage device that is not shown, performs the processing operation upon execution of each of the operating process in various types under control of the process management operating unit 60, and outputs the processed data as the output data configured with one or more output files. The input data herein are such a concept that certainly contains the data as a source but contains the intermediate data for another operation process in a case where the intermediate data created in an operation process is used as the input for the previous operation process. In the same manner, the output data herein are such a concept that certainly contains not only the final output data but also contains the intermediate data for a operation process in a case where the intermediate data created in the operation process is used as the input for another operation process. When creating the intermediate data or the output data, the operation processing unit 40 writes those data in the predetermined external storage device, not shown, and reads out the data written in the external storage device if needed.

The display and operation unit 50 is configured as a user interface, for example, the display device such as the LCD, or the operation device such as the keyboard, the mouse, or the like in the same manner as the display and operation unit 10. With the batch processing apparatus, an operator operating the system performs such an operation for controlling the process operation, by providing the batch process starting instruction through the display and operation unit 50, in a case of performing the batch process with the batch processing apparatus. Furthermore, the display and operation unit 50 can display the output data to be ultimately output. That is, the display and operation unit 50 is operated by the operator to provide the batch process starting instruction or to perform monitoring. The information indicative of the batch process starting instruction or the like input through the display and operation unit 50 is supplied to the process management operating unit 60.

The process management operating unit 60 controls the process operation in accordance with the instruction provided through the display and operation unit 50. Upon reception of the instruction through the display and operation unit 50, the process management operating unit 60 supplies the control signal to the repository 30 so that the corresponding metadata are read out of the repository 30 while supplying the control signal for rendering the operation processing unit 40 able to perform the corresponding process.

Figure 3:
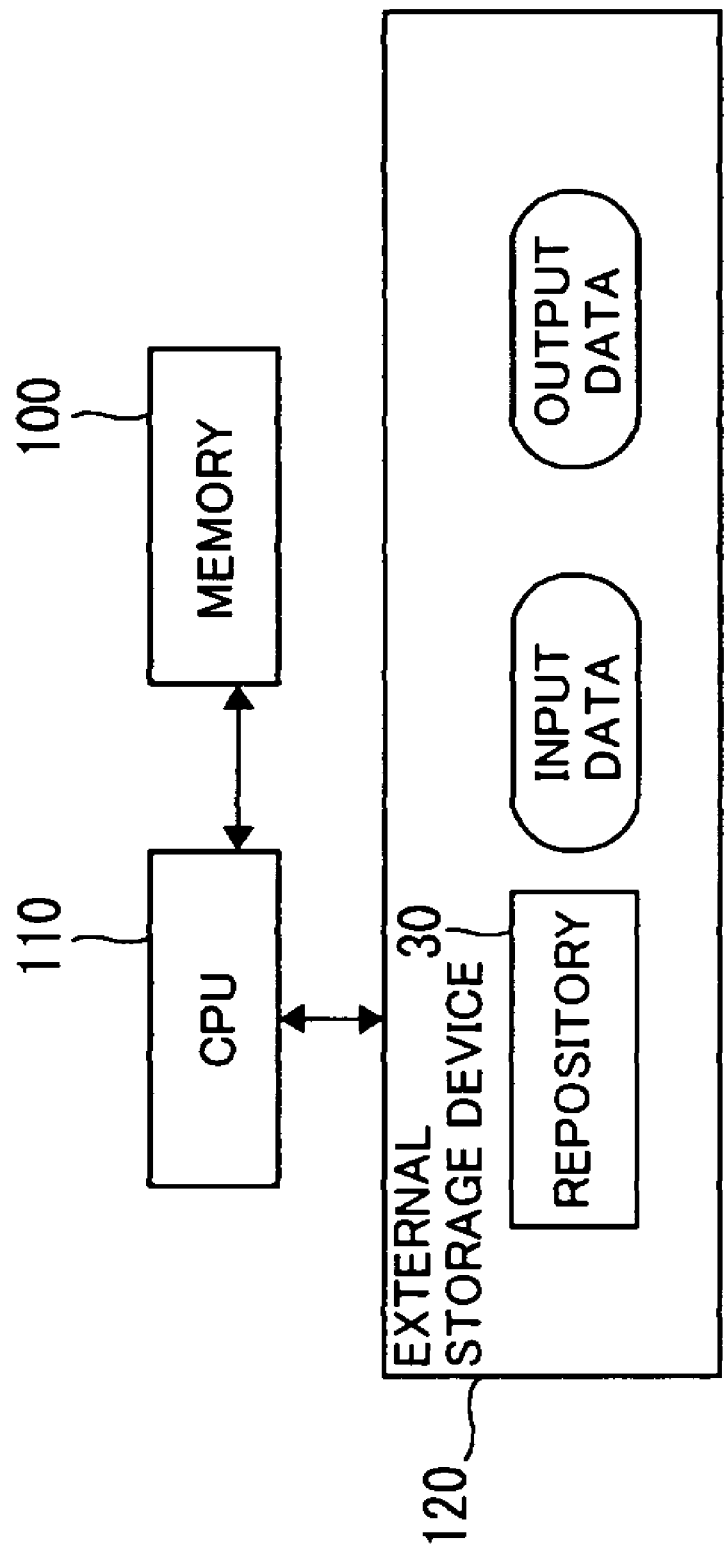
FIG. 3 is a block diagram illustrating a specific hardware structure of the batch processing apparatus.

To be more specific, this type of the batch processing apparatus is configured with such hardware as shown in FIG. 3. It is to be noted that FIG. 3 does not show the display and operation units 10 and 50. That is, a CPU (Central Processing Unit) controlled in accordance with a program developed in memory 100 can implement the function of the metadata input unit 20, the operation processing unit 40, and the process management operating unit 60 in the batch processing apparatus. In the batch processing apparatus, the CPU 110 functioning as the metadata input unit 20 previously creates the repository 30 in the external storage device before the CPU 110 functioning as the operation processing unit 40 executes the operating process. Furthermore, in the batch processing apparatus, the external storage device 120 preliminarily memorizes the input data as a source while memorizing the output data upon creation thereof.

As described above, the batch processing apparatus can enhance the speed of the process by having the structure in which the metadata and the data to be processed are developed in the memory 100.

The batch processing apparatus performs the predetermined processing operation on the input data upon execution of each of the operation processes in various types by the operation processing unit 40. Herein, a function necessary for the batch process is discussed with consideration to a function to be implemented with the operation processing unit 40.

Cited as a function necessary for the batch process is a data input and output function. That is, the batch process requires the function for inputting multiple objective tables accompanied by a relation control and the function for outputting the data to the objective tables as the data input and output function.

Also, a data structure transformation function is cited as a function necessary for the batch process. In other words, the patch process requires the function for transforming the data structure into the output data structure, as the data structure transformation function.

Furthermore an operation function between the data items, i.e., the rows in the single record, is cited as a function necessary for the batch process. That is, the batch process requires the extraction condition function for extracting the input data corresponding to the processing object, the code conversion condition for converting the code into the code of the output data in a case where the data item of the input data contains the code, and the derivation operation function under conditions such as a four arithmetic operation or various function operations, as the operation function between the data items.

Yet further, an operation function between columns, i.e., the records, is cited as a function necessary for the batch process. That is, the batch process necessitates a management unit operation function for grouping and outputting the data items serving as a factor, such as, e.g., a store, a customer, or the like, as each management unit for expressing an output unit of the output data. The batch process further requires an operation function of the category hierarchy as an operation function between the records, to make the operation performable under the condition that, for example, such industrial classifications as, e.g., the agricultural industry, the fishing industry, and the like are grouped as a single industrial classification code such as the primary industry. Further, the batch process requires a group operation function for performing a group operation such as a summation process of the parent-child relationship existing in the input data, as the operation function between the records. Yet further, the batch process necessitates an extraction operation function with a condition issuance such as four arithmetic operations, various function operations, or the like, using units of operation and aggregation, as the operation function between the records, as in the case of performing the operation for each transaction number and an aggregation operation for each customer unit.

Furthermore, a time series updating and operation function is necessary for the batch process. That is, the batch process necessitates the time series updating function, a past value setting function, a comparison operation function, a past correction function, and the like.

Herein, the batch processing apparatus can enhance the speed of the process through the structure in which the metadata and the data to be processed are developed in the memory 100, as described above. The batch processing apparatus, however, has difficulty developing the data in the memory 100 due to the large data amount in a case of the operation process between the data over multiple instances in a management unit, as in the case of the group operation and the time series operation described above, even though the batch processing apparatus can develop and process in the memory 100 the data in the single instance in the management unit because of the limited data amount.

Figure 4:
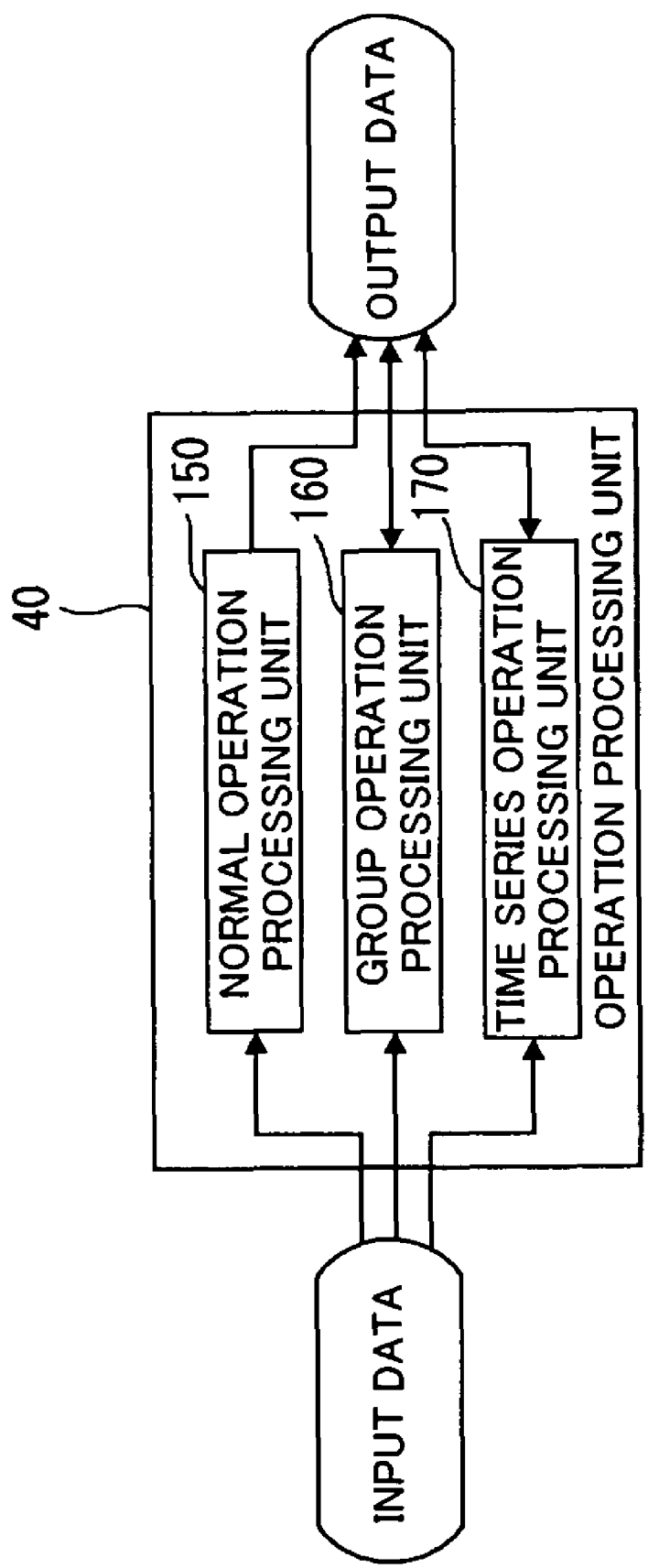
FIG. 4 is a block diagram illustrating a structure of an operation processing unit mounted in the batch processing apparatus.

The batch processing apparatus is thus structured in a manner containing three processing units, i.e., a normal operation processing unit 150 for performing a normal operation except the group operation and the time series operation as described above, a group operation processing unit 160 for performing a group operation process defined as a group aggregation in the parent-child relationship existing in the input data, a time series operation processing unit 170 for performing a time series operation process for updating the time series data are formed as shown in FIG. 4, as the operation processing unit 40 to satisfy all of the functions in various types as described above, in spite of developing and processing the data in the memory 100, and further that the data are intermediately created between the group operation process and the time series operation process. In the batch processing apparatus, the normal operation processing unit is broadly divided into a summary operation processing unit for performing a summary operation process produced upon creation of the summary data and a specific operation processing unit for performing a specific operation process produced upon creation of the specific data, which are not illustrated herein.

Figure 5:
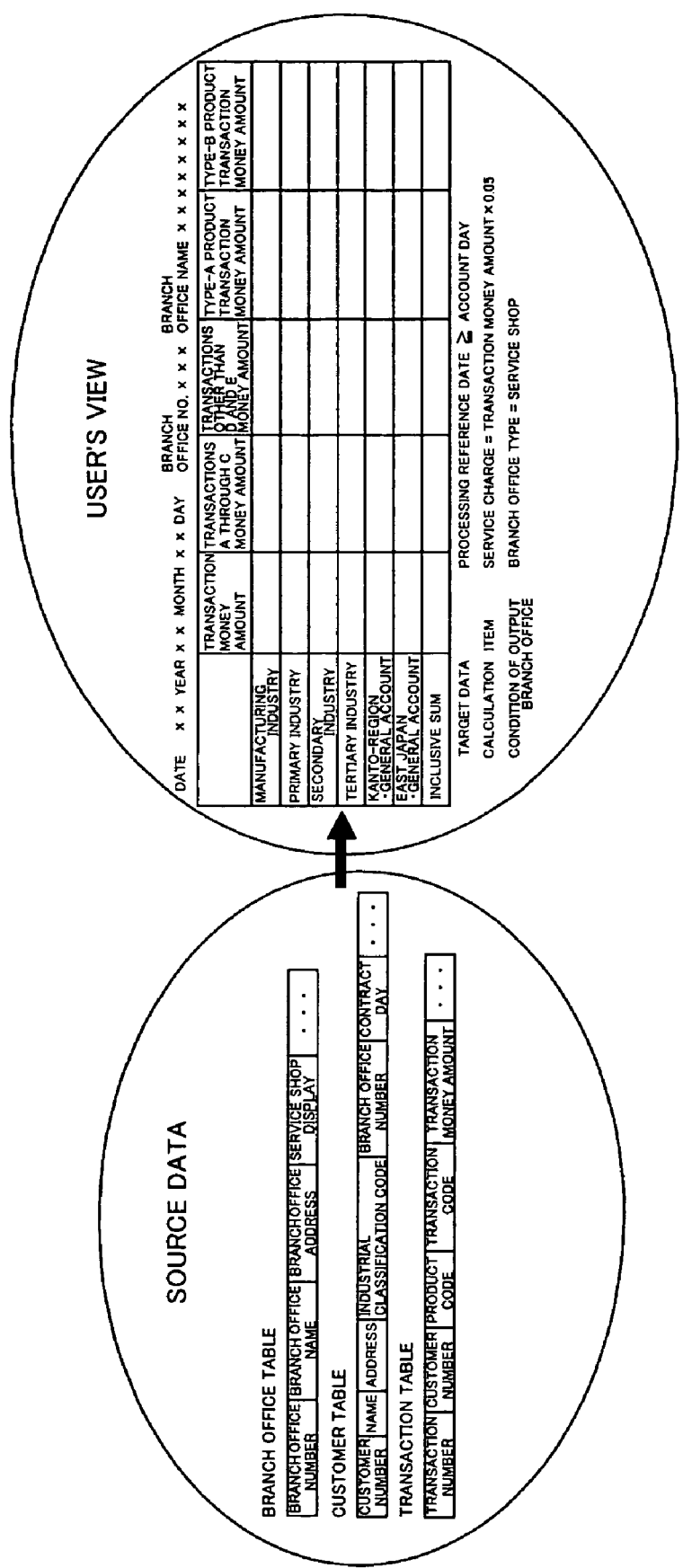
FIG. 5 is a view illustrating an example of summary data.

In addition, the summary data, an example of which is shown in FIG. 5, are defined as a cross-tabulation table of a summary summarized by branch office, created as the output data (user's view) based on the input data as a source, which are defined as the branch table configured with information concerning a branch office number, a branch office name, a branch office address, a service shop display, and the like, a customer table configured with information concerning a customer number, a name, an address, an industrial classification code, a branch office number, a contract date, and the like, and a transaction table configured with information concerning a transaction number, a customer number, a product code, a transaction code, a transaction money amount, and the like. It is to be noted that the user's view is a designed specification at the time of an output display on a display screen but may correspond to or may be partially different from a format of the output data to be actually output as the data. An example will be given later explaining a relation between the user's view and the output data.

Figure 6:
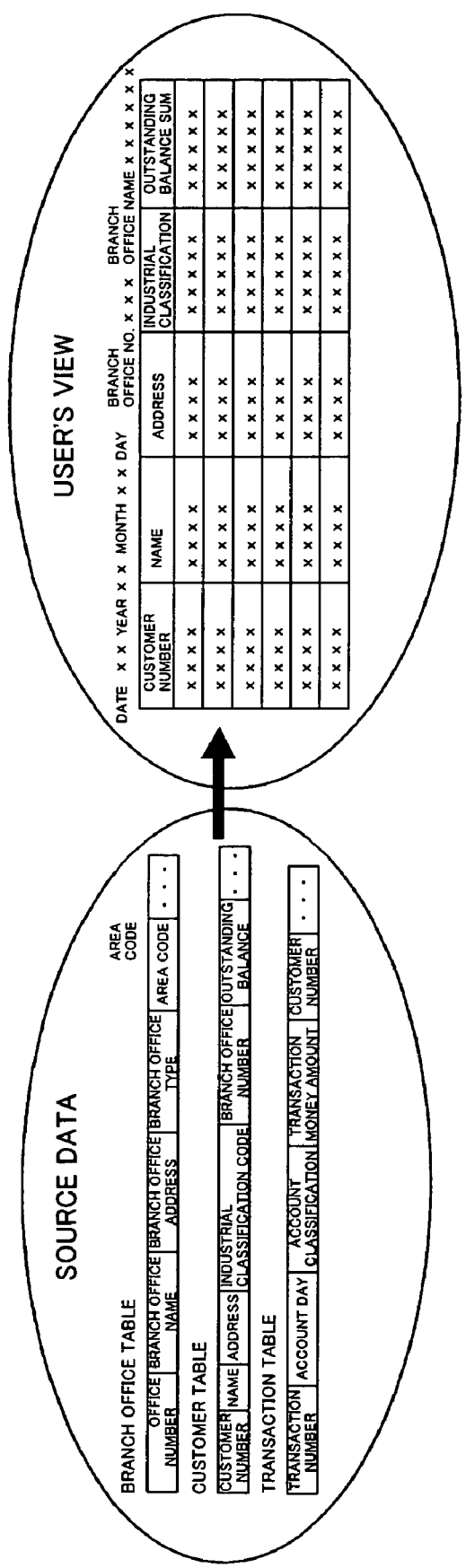
FIG. 6 is a view illustrating an example of specific data.

The specific data are defined as a customer-oriented specification and the like created as the output data (user's view) based on the input data as a source, which are defined as the branch office table configured with information concerning a branch office number, a branch office name, a branch office address, a branch office type, an area code, and the like, the customer table configured with information concerning a customer number, a name, an address, an industrial classification, a branch office number, an outstanding balance, and the like, the transaction table configured with information a transaction number, an account day, an account classification, a transaction money amount, a customer number, and the like, as shown in FIG. 6.

In the batch processing apparatus, the normal operation processing unit $150_1$ the group operation processing unit 160, and the time series operation processing unit 170, as described above, form the process flow in series with one another, as shown in FIG. 7. In the operation processing unit 40, it is to be noted that the group operation processing unit 160 and the time series operation processing unit 170 out of those three processing units are executed only when existing in the process created as metadata MD.

Herein, the input data as shown in FIG. 4 corresponds to a source data or an intermediate file in FIG. 7 whereas the output data in FIG. 4 corresponds to an intermediate file or an output file shown in FIG. 7. In other words, in the data processing apparatus, the output data in the single process flow in series can be defined in the metadata, as the input data in another process flow in series, and thus a network for the process can be constructed.

In concrete terms, the normal operation processing unit 150 includes a metadata acquisition unit 151 for acquiring the metadata MD, an input unit 152 for a source file SF as the input data, a normal operation unit 153 for performing a normal operation, and an output unit 154 for outputting the intermediate file MF1 as shown in FIG. 7. Furthermore, the group operation processing unit 160 includes a metadata acquisition unit 161 for acquiring the metadata MD, an input unit 162 for inputting the intermediate file $MF_1$ as the input data, a group operation unit 163 for performing the group operation, and an output unit 164 for outputting the intermediate file $MF_2$ as the output data. Furthermore, the time series operation processing unit 170 includes a metadata acquisition unit for acquiring the metadata MD, an input unit 172 for inputting the intermediate file $MF_2$, a time series operation unit 173 for performing the time series operation, and an output unit 174 for outputting the output file OF serving as the output data.

In the operation processing unit 40 configured with those three processing units, the output data created in the normal operation process are used in the group operation process, and further, in a case where the output data created in the group operation process are used in the time series operation process, the data are transferred between the operation processes as described hereinafter.

That is, in the operation processing unit 40, the predetermined operation is performed based on the metadata MD by the normal operation unit 153 and the single intermediate file $MF_1$ defined as the output data is output from the output unit 154 where the metadata MD of the normal operation processing unit 150 are input in the metadata acquisition unit 151 whereas one or more source files SF defined as the input data are input in the input unit 152.

In the operation processing unit 40, the predetermined group operation is subsequently performed based on the metadata MD by the group operation unit 163 and the single intermediate file $MF_2$ as the output data are output from the output unit 164 where the metadata MD are input in the metadata acquisition unit 161 in the group operation processing unit while the single intermediate file $MF_1$ output from the output unit 154 in the output operation processing unit 150 or the source file set with the group information, not shown, are input as the input data in the input unit 162.

In the operation processing unit 40, the predetermined time series operation is performed based on the metadata MD by the time series operation unit 173 and the one or more output files OFs are output as the output data, from the output unit 174 where the metadata MD are input in the metadata acquisition unit 171 in the time series operation processing unit 170 while the single intermediate file $MF_2$ output from the output unit 164 in the group operation processing unit 160 or the intermediate file output from the output unit 154 in the normal processing unit $150_1$ not shown, is input as the input data in the input unit 152.

As described above, in the batch processing apparatus, the output data created in the normal operation process are used in the group operation process, and further, the network of the process is structured so that the output data created in the group operation process are used in the time series operation process. In the batch processing apparatus, furthermore, one or more output data are created and output without outputting the intermediate data in a case where only the normal operation process is needed. On the other hand, where the process is shifted to another in the batch processing apparatus, the intermediate data are to be created but one set is enough even where multiple sets of the output data are to be eventually created.

Furthermore, in the batch processing apparatus, for example, process flows are respectively produced for classifications such as an arbitrary business service unit, a processing timing (processing cycle) such as a day, a month, or the like, a management unit for specifying an output unit of the output data concerning a shop, a customer, or the like, and specific data or the summary data are created. The metadata can be defined so that the output data in the aforementioned process flows are used as the input data in other process flows.

Figure 8:
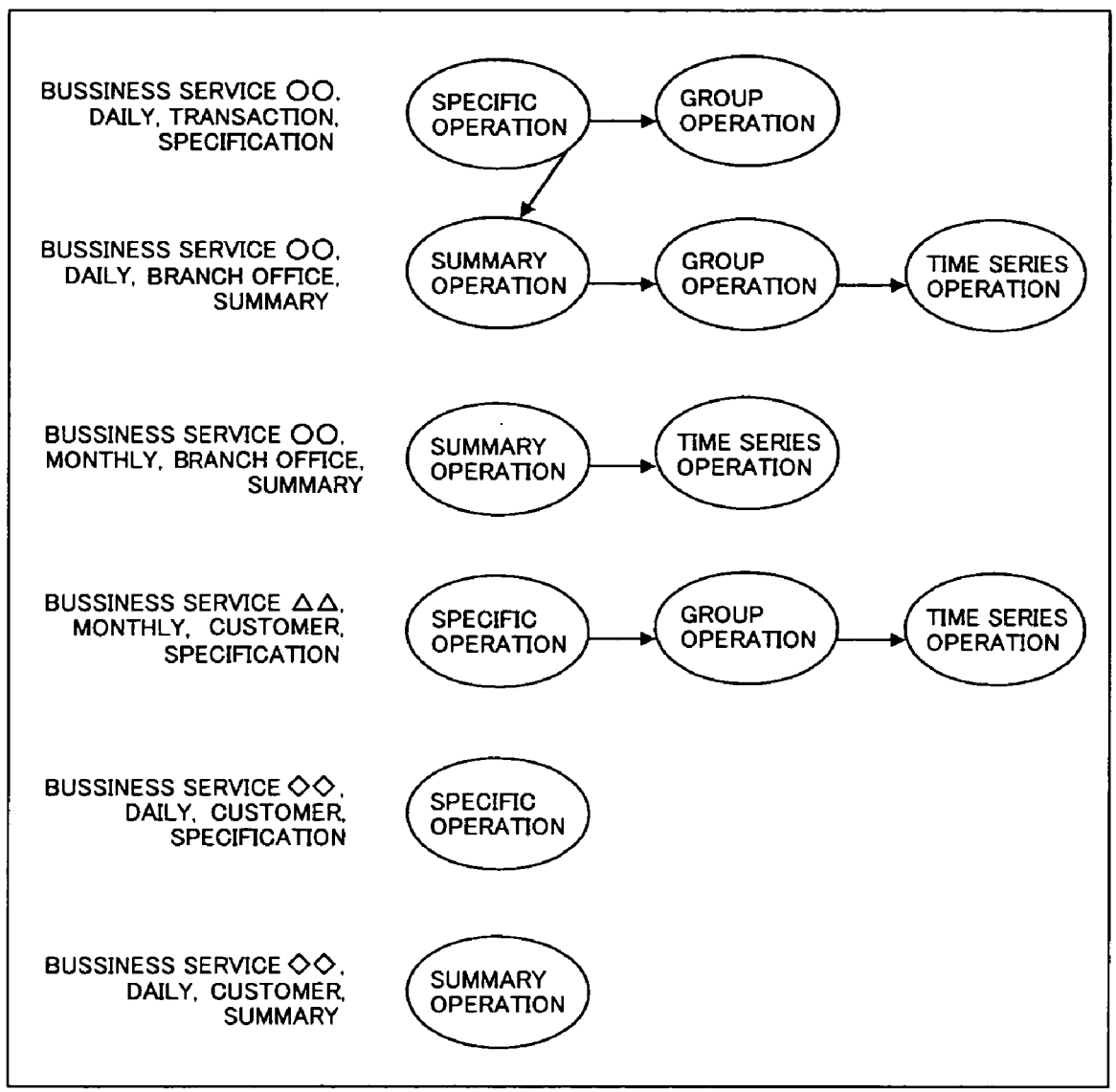
FIG. 8 is a view illustrating an example of the process flow in the batch processing apparatus.

In the batch processing apparatus, for example, the metadata are defined in a manner to produce a process flow as shown in FIG. 8 in a case of creating data concerning "daily transaction-specific particulars about business service ○○", "daily branch office-specific summary about business service ○○", "monthly branch office-specific summary about business service ○○", "monthly customer-specific particulars about business service ΔΔ", "daily customer-specific particulars about business service □□", and "daily customer-specific summary about business service □□".

That is, the batch processing apparatus creates the data concerning "daily branch office-specific summary about business service ○○" by producing as a process flow for each management unit and cycle, the specific operation process and the group operation process with the output data created in the specific operation process, defined as the input data, as shown in the first line in FIG. 8.

The batch processing apparatus creates the data concerning "daily branch office-specific summary about business service ○○" by producing as a process flow for each management unit and cycle, the summary operation process, the group operation process with the output data created in the summary operation process, defined as the input data, and the time series operation process with the output data created in the group operation process, defined as the input data, as shown in the second line in FIG. 8. In this situation, the metadata are defined in the batch processing apparatus in a manner to use as the input data for the summary operation process, the output data created in the specific operation process performed at the time of creating the data concerning "daily transaction-specific particulars about business service ○○".

The batch processing apparatus, furthermore, creates the data concerning "monthly branch office-specific summary about business service ○○" by producing as a process flow for each management unit and cycle, the summary operation process and the time series operation process with the output data created in the summary operation process, defined as the input data, as shown in the third line in FIG. 8.

The batch processing apparatus creates the data concerning "monthly customer-specific summary about business service ΔΔ" by producing as a process flow for each management unit and cycle, the specific operation process, the group operation process with the output data created in the specific operation process, defined as the input data, and the time series operation process with the output data created in the group operation process, defined as the input data, as shown in the fourth line in FIG. 8.

Furthermore, the batch processing apparatus creates the data concerning "daily custom-specific particulars about business service □□" by producing the specific operation process as a process flow for each management unit and cycle, as shown in the fifth line in FIG. 8.

Yet further, the batch processing apparatus creates the data concerning "daily customer-specific summary about business service □□" by producing the summary operation process as a process flow for each management unit and cycle, as shown in the sixth line in FIG. 8.

As described above, in the batch processing apparatus, the process flows are respectively produced for the management units and the cycles, and the network of various processes can be structured by defining the metadata in a manner to use the output data in the process flows as the input data in another process flow.

Next, contents of the metadata produced for each operation process in the batch processing apparatus formed based on a conception of the aforementioned processing are explained in detail while processing operation contents of each operation process are further described.

A case of the summary operation process is explained first.

In the batch processing apparatus, the repository 30 supplies each type of metadata to a summary operation processing unit $150_1$ for performing the summary operation process structured as shown in FIG. 9 to implement the summary operation process.

Herein, a summary operation unit $153_1$ corresponding to the normal operation unit 153 in the normal operation processing unit 150 previously shown in FIG. 7 has an extraction condition judging unit 201 for judging an extraction condition, a code conversion unit 202 for converting a code, a derivation operation unit 203 for performing a derivation operation with a condition such as a four arithmetic operation or various function operations, a category operation unit 204 for performing a category operation based on a hierarchy between categories defined in the metadata upon creation of the summary data of multidimensional and multi-level hierarchy, a category operation unit based derivation operation unit 205 for performing the derivation operation after the category operation by the category operation unit 204 to create the summary data of the multidimensional and multi-level hierarchy, and a data structure transformation unit 206, as shown in FIG. 9.

Furthermore, the batch processing apparatus produces as the metadata necessary for the summary operation process, in the repository 30, interface metadata indicating various buffers or a relation of links between those buffers as described later, input and output information metadata indicating the input data and the output data, extraction condition metadata indicating an extraction condition expression expressed with the data item of the input data as a factor, code conversion metadata indicating contents of the code conversion for converting the value of the data item of the input data into the code of the output data and the conversion method, derivation operation metadata indicating a derivation operation expression for expressing the output data derived based on the data item of the input data, category operation metadata indicating the category operation based on the hierarchy between the categories in a case of creation of the summary data of the multidimensional and multi-level hierarchy, category operation based derivation operation metadata indicating the derivation operation expression after the category operation based on the hierarchy between the categories in a case of creation of the summary data of the multidimensional and multi-level hierarchy, calculation area metadata indicating a calculation buffer as an area for holding the calculated result as described later, and data structure transformation metadata indicating transformation of the data structure into the output data structure. In the batch processing apparatus, all of these sets of metadata are supplied through the metadata acquisition unit 151 to the units, respectively.

In the batch processing apparatus, the interface metadata are first supplied through the metadata acquisition unit 151 to the input unit 152, the summary operation unit 1531, and the output unit 154, and various buffers or a relation of links between those buffers are clearly indicated based on the interface metadata.

Furthermore, in the batch processing apparatus, the input and output information metadata are supplied through the metadata acquisition unit 151 to the input unit 152 and the output unit 154, and the information on the input data or output data, or the management unit or relations between the multiple sets of data are clearly indicated based on the input and output information metadata.

In the batch processing apparatus, the extraction condition metadata are supplied to the extraction condition judging unit 201 through the metadata acquisition unit 151, and the extraction condition is judged based on the extraction condition metadata.

Furthermore, in the batch processing apparatus, the code conversion metadata are supplied to the code conversion unit 202 through the metadata acquisition unit 151, and the code is converted based on the code conversion metadata.

In the batch processing apparatus, the derivation operation metadata are supplied to the derivation operation unit 203 through the metadata acquisition unit 151, and the derivation operation is performed based on the derivation operation metadata.

In the batch processing apparatus, the category operation metadata are supplied to the category operation unit 204 through the metadata acquisition unit 151, and the category operation is performed based on the category operation metadata.

Yet further, in the batch processing apparatus, the calculation area metadata are supplied to the category operation unit 204 through the metadata acquisition unit 151, and the calculation buffer is clearly indicated based on the category operation metadata.

In the batch processing apparatus, the category operation based derivation operation metadata are supplied to the category operation based derivation operation unit 205 through the metadata acquisition unit 151, and the derivation operation is performed after the category operation based on the category operation based derivation operation metadata.

In the batch processing apparatus, furthermore, the data structure transformation metadata are supplied to the data structure transformation unit 206 through the metadata acquisition unit 151, and the data are transformed into the output data in a structure based on the data structure transformation metadata.

Figure 10:
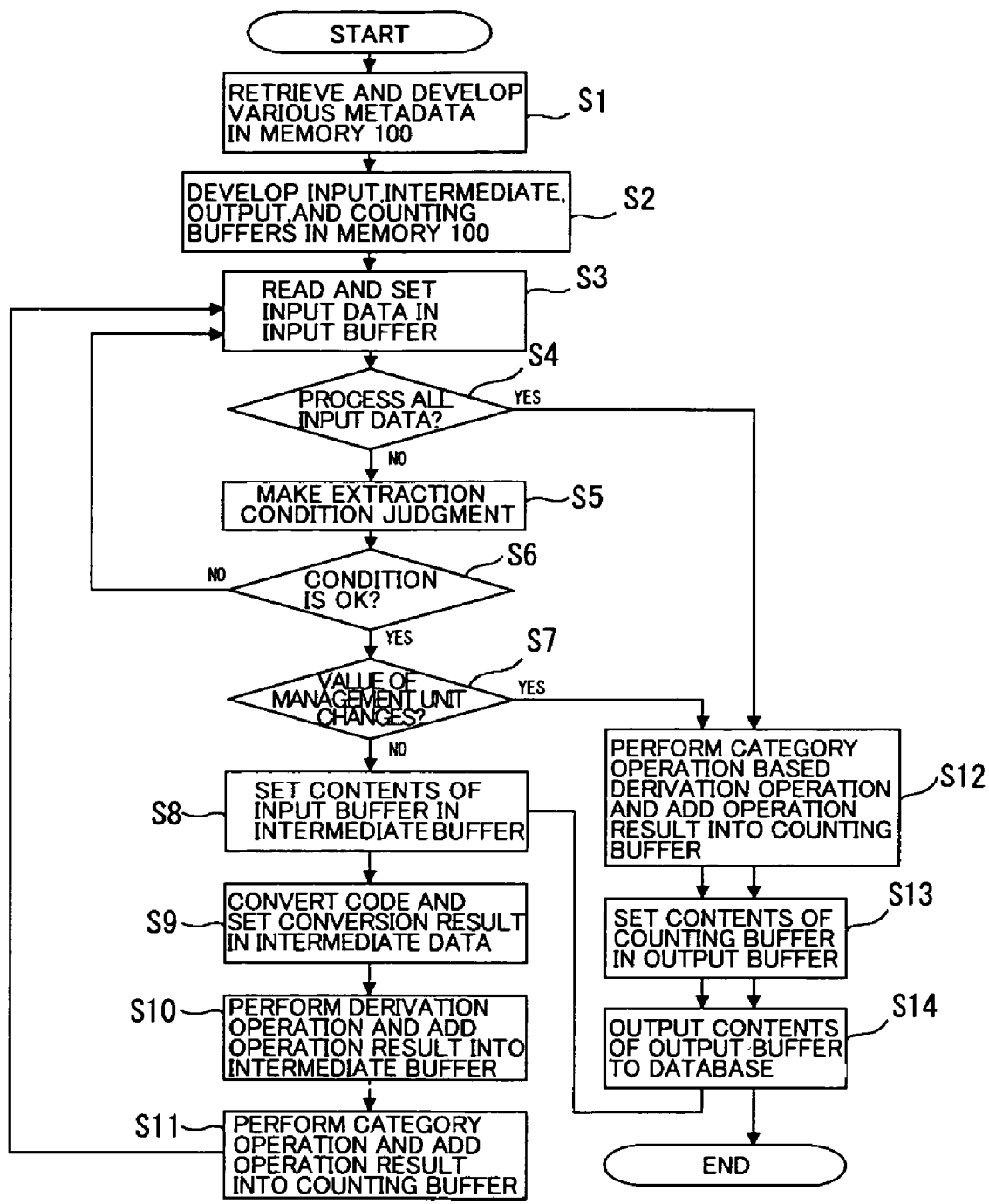
FIG. 10 is a flow chart showing a sequence of steps at the time that the summary operation processing unit performs a summary operation process.

The summary operation processing unit $150_1$ for performing the process based on various metadata as described above executes a series of procedural steps as shown in FIG. 10, thereby being able to implement the summary operation process.

First, the summary operation processing unit $150_1$ acquires various metadata from the repository 30 at the step S1, as shown in FIG. 10, and develops the metadata in the memory 100 previously shown in FIG. 3, thereby developing in the memory 100 an input buffer for holding the input data, an intermediate buffer for processing the data, an output buffer for holding the output data, and a calculation buffer for holding a calculated result, based on the interface metadata at the step S2.

The summary operation processing unit $150_1$ reads the input data based on the input and output information metadata at the step S3, and sets the input data in the input buffer developed in the memory 100. In addition, the summary operation processing unit $150_1$ develops multiple input buffers in the memory 100 and sets the multiple sets of the input data in each of the input buffers in a case of inputting the multiple sets of the input data.

Subsequently, the summary operation processing unit $150_1$ makes a judgment at the step S5, as to whether the process is performed for all the input data. Herein, the summary operation processing unit $150_1$ shifts the process to the step S5 in a case where the process is not yet performed for all the input data. On the other hand, the summary operation processing unit $150_1$ shifts the process to the step S12 in a case where the process is already performed for all the input data.

The summary operation processing unit $150_1$ judges the extraction condition based on the extraction condition metadata using the extraction condition judging unit 201 at the step S5 in a case of making a judgment at the step S4, where the process is not performed for all the input data.

The summary operation processing unit $150_1$ repeats the process from the step S3 without processing the input data in a case of making a judgment at the step S6 that the extraction condition is not satisfied.

The summary operation processing unit $150_1$, on the other hand, makes a judgment at the step S7 as to whether a value of the management unit is changed or not, in a case of making a judgment at the step S6 that the extraction condition is satisfied.

Herein, the summary operation processing unit $150_1$ shifts the process to the step S12 upon judgment at the step S7 that a value of the management unit is changed and performs using the category operation based derivation operation 205, the derivation operation after the category operation, based on the category operation based derivation operation metadata, thereby setting the result thereof in the calculation buffer developed in the memory 100.

The summary operation processing unit $150_1$ sets the contents of the calculation buffer in the output buffer developed in the memory 100 at the step S113, and outputs contents of the output buffer into the database at the step S14. It is to be noted that the summary operation processing unit $150_1$ develops multiple output buffers in the memory 100 in a case of outputting multiple sets of the output data, and transforms the data into the output data in structure by establishing associations between the calculation buffer and the multiple output buffers based on the data structure transformation metadata using the data structure transformation unit 206. The summary operation processing unit $150_1$ then shifts the process to the step S8.

On the other hand, the summary operation processing unit $150_1$ shifts the process to the step S8 upon judgment at the step S7 that a value of the management unit is not changed. The summary operation processing unit $150_1$ sets the contents of the input buffer in the intermediate buffer developed in the memory 100 at the step S8, converts the code based on the code conversion metadata using the code conversion unit 202 at the step S9, and sets the result thereof in the intermediate buffer.

The summary operation processing unit $150_1$ subsequently performs the derivation operation based on the derivation operation metadata using the derivation operation unit 203 at the step S10, and further adds the result thereof to update the intermediate buffer.

The summary operation processing unit 150₁ performs the category operation based on the category operation metadata and the calculation area metadata using the category operation unit 204 at the step S11, and adds the result thereof to further update the calculation buffer, thereby repeating the process from the step S3.

The summary operation processing unit 150₁ repeats the procedural steps as described above, and performs the derivation operation after the category operation using the category operation based derivation operation unit 205 at the step S12, thereby adding the result thereof to update the calculation buffer developed in the memory 100, in a case of judging that the process is performed for all the output data at the step S4.

After setting the contents of the calculation buffer at the step S113, the summary operation processing unit 150₁ outputs the contents of the output buffer as the final output data into the database at the step S14, thereby terminating this series of processes. In a case of outputting multiple sets of the output data, the summary operation processing unit 150₁ develops multiple output buffers in the memory 100 and establishes associations between the calculation buffer and the multiple output buffers based on the data structure transformation metadata to transform the data structure into the output data structure by using the data structure transformation unit 206.

The summary operation processing unit 150₁ executes a series of procedural steps in this manner, thereby being able to implement the summary operation process.

That is, the summary operation processing unit 150₁ develops various metadata in the memory 100 upon acquisition of these metadata from the repository 30 where the summary operation process is started or started as a process to be subsequently started under the control of the process management operating unit 60. The summary operation processing unit 150₁ acquires the management unit based on the input and output information metadata in accordance with management unit acquisition order, reads the records necessary for the input data in the input buffer based on the input and output information metadata and the extraction condition metadata in accordance with an input order of the data as a processing object, and thereafter sets the necessary data items from the input buffer into the intermediate buffer. Where converting the code based on the code conversion metadata in accordance with a code conversion order, the summary operation processing unit 150₁ sets the result thereof in the intermediate buffer, performs the derivation operation based on the derivation operation metadata in accordance with a derivation operation order, and adds the result to update the intermediate buffer until the management unit is changed. Furthermore, the summary operation processing unit 150₁ performs the category operation based on the category operation metadata and the calculation area metadata in accordance with a category operation instruction, adds the result thereof to update the intermediate buffer until the management unit is changed, performs the derivation operation after the category operation based on the category operation based derivation operation metadata in accordance with a derivation operation order after the category operation subsequent to change of the management unit, and then sets the result thereof in the calculation buffer.

The summary operation processing unit 150₁, sets the contents of the calculation buffer into the output buffer based on the data structure transformation metadata upon reception of an output buffer setting order at every change of the management unit, and writes the contents of the output buffer in the intermediate data or the multiple sets of the output data classified by objective, based on the output information metadata at every change of the management unit, in accordance with a data output order.

As described above, the summary operation processing unit 150₁ can create the summary data of a multidimensional and multi-level hierarchy by executing the summary operation process based on the various metadata.

A case of the specific operation process is explained next.

Figure 11:
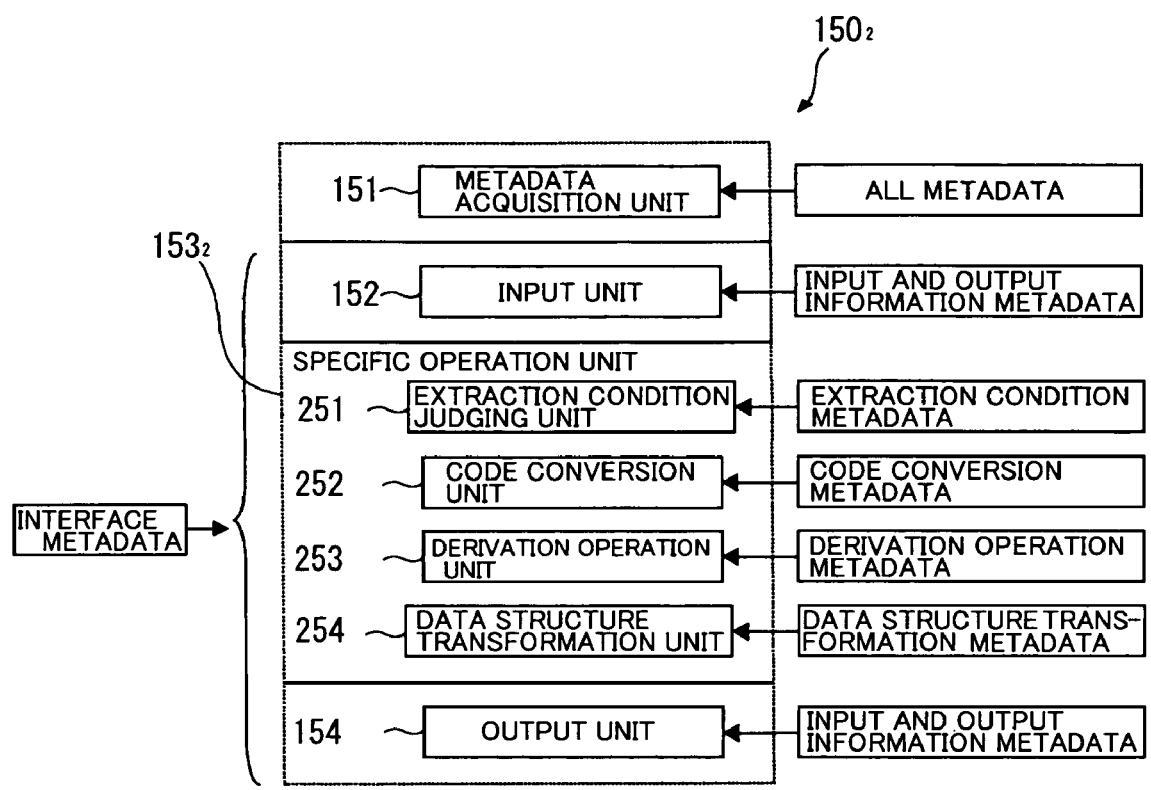
FIG. 11 is a view illustrating a structure of a specific operation processing unit installed in the operation processing unit and contents of metadata.

In the batch processing apparatus, the repository 30 supplies each type of metadata to a specific operation processing unit 150₂ for performing the specific operation process structured as shown in FIG. 11 to implement the specific operation process.

Herein, a specific operation unit 153₂ corresponding to the normal operation unit 153 in the normal operation processing unit 150 previously shown in FIG. 7 has an extraction condition judging unit 251 for judging an extraction condition, a code conversion unit 252, a derivation operation unit 253 for performing an derivation operation with a condition such as a four arithmetic operation or various function operation, and a data structure transformation unit 254 for converting the data structure in the output data structure.

Furthermore, the batch processing apparatus produces as the metadata necessary for the specific operation process, in the repository 30, the interface metadata indicating various buffers or a relation of links between those buffers, the input and output information metadata indicating the input data and the output data, extraction condition metadata indicating an extraction condition expression expressed with the data item of the input data as a factor, the code conversion metadata indicating contents of the code conversion for converting the value of the data item of the input data into the code of the output data and the conversion method, the derivation operation metadata indicating a derivation operation expression for expressing the output data derived based on the data item of the input data, and the data structure transformation metadata indicating transformation of the data structure into the output data structure. In the batch processing apparatus, all of these sets of metadata are supplied through the metadata acquisition unit 151 to the units, respectively.

In the batch processing apparatus, the interface metadata are first supplied through the metadata acquisition unit 151 to the input unit 152, the specific operation unit 153₂, and the output unit 154, and various buffers or a relation of links between those buffers are clearly indicated based on the interface metadata.

Furthermore, in the batch processing apparatus, the input and output information metadata are supplied through the metadata acquisition unit 151 to the input unit 152 and the output unit 154, and the information on the input data or output data, or the management unit or a relation between multiple sets of data is clearly indicated based on the input and output information metadata. In the batch processing apparatus, the extraction condition metadata are supplied to the extraction condition judging unit 251 through the metadata acquisition unit 151, and the extraction condition is judged based on the extraction condition metadata.

Furthermore, in the batch processing apparatus, the code conversion metadata are supplied to the code conversion unit 252 through the metadata acquisition unit 151, and the code is converted based on the code conversion metadata.

In the batch processing apparatus, the derivation operation metadata are supplied to the derivation operation unit 253 through the metadata acquisition unit 151, and the derivation operation is performed based on the derivation operation metadata.

In the batch processing apparatus, furthermore, the data structure transformation metadata are supplied to the data structure transformation unit 254 through the metadata acquisition unit 151, and the data are transformed into the output data in a structure based on the data structure transformation metadata.

Figure 12:
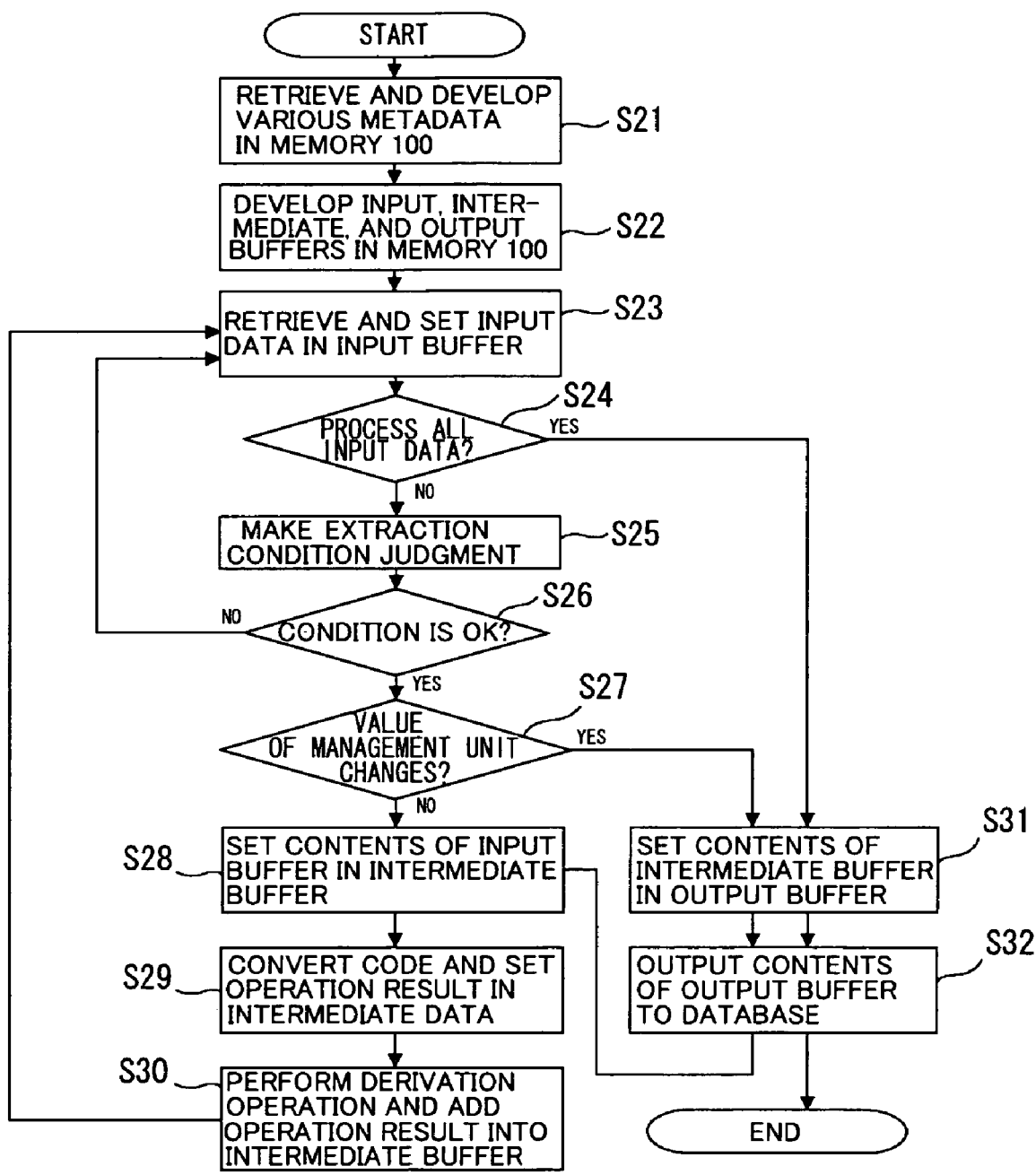
FIG. 12 is a flow chart showing a sequence of steps at the time that the specific operation processing unit performs a specific operation process.

The specific operation processing unit $150_2$ for performing the process based on various metadata as described above executes a series of procedural steps as shown in FIG. 12, thereby being able to implement the specific operation process.

First, the specific operation processing unit $150_2$ acquires various metadata from the repository 30 at the step S21, as shown in FIG. 12, and develops the metadata in the memory 100, thereby developing in the memory 100 the input buffer for holding the input data, the intermediate buffer for processing the data, the output buffer for holding the output data, and the calculation buffer for holding a calculated result, based on the interface metadata at the step S22.

The specific operation processing unit $150_2$ reads the input data based on the input and output information metadata at the step S23, and sets the input data in the input buffer developed in the memory 100. In addition, the specific operation processing unit $150_2$ develops multiple input buffers in the memory 100 and sets the multiple sets of the input data in each of the input buffers in a case of inputting the multiple sets of the input data.

Subsequently, the specific operation processing unit $150_2$ makes a judgment at the step S24, as to whether the process is performed for all the input data. Herein, the specific operation processing unit $150_2$ shifts the process to the step S25 in a case where the process is not yet performed for all the input data. On the other hand, the specific operation processing unit $150_2$ shifts the process to the step S31 upon judgment that the process is already performed for all the input data.

The specific operation processing unit $150_2$ judges the extraction condition based on the extraction condition metadata using the extraction condition judging unit 251 at the step S25 in a case of making a judgment at the step S24, that the process is not performed for all the input data.

The specific operation processing unit $150_2$ repeats the process from the step S23 without processing the input data in a case of making a judgment at the step S26 that the extraction condition is not satisfied.

On the other hand, the specific operation processing unit $150_2$ makes a judgment at the step S27 as to whether a value of the management unit is changed or not, in a case of making a judgment at the step S26 that the extraction condition is satisfied.

Herein, the specific operation processing unit $150_2$ shifts the process to the step S31 upon judgment at the step S27 that a value of the management unit is changed, and sets the contents of the intermediate buffer developed in the memory 100 in the output buffer developed in the same memory 100, thereby outputting contents of the output buffer into the database at the step S32. The specific operation processing unit $150_2$ shifts the process to the step S28. It is to be noted that the specific operation processing unit $150_2$ develops the multiple output buffers in the memory 100 in a case of outputting the plural sets of the output data, and transforms the data into the output data in structure by establishing associations between the calculation buffer and the multiple output buffers based on the data structure transformation metadata using the data structure transformation unit 254.

On the other hand, the specific operation processing unit $150_2$ shifts the process to the step S28 upon judgment at the step S27 that a value of the management unit is not changed. The specific operation processing unit $150_2$ sets the contents of the input buffer in the intermediate buffer at the step S28, converts the code based on the code conversion metadata using the code conversion unit 252 at the step S29, and sets the result thereof in the intermediate buffer.

The specific operation processing unit $150_2$ subsequently performs the derivation operation based on the derivation operation metadata using the derivation operation unit 253 at the step S30, and further adds the result thereof to update the intermediate buffer, thereby repeating the process from the step S23.

The specific operation processing unit $150_2$ repeats the procedural steps as described above and outputs, in a case of judging that the process is performed for all the output data at the step S24, the contents of the output buffer as the final output data into the database at the step S32, to terminate this series of processes after setting the contents of the intermediate buffer into the output buffer at the step S31. It is to be noted that the specific operation processing unit $150_2$ develops the multiple output buffers in the memory 100 in a case of outputting the multiple sets of the output data, and transforms the data into the output data in structure by establishing associations between the intermediate buffer and the multiple output buffers based on the data structure transformation metadata using the data structure transformation unit 254.

The specific operation processing unit $150_2$ executes a series of procedural steps as shown in FIG. 10, thereby being able to implement the specific operation process.

That is, the specific operation processing unit $150_1$ develops various metadata in the memory 100 upon acquisition of these metadata from the repository 30 where the specific operation process is started or started as a process to be subsequently started under the control of the process management operating unit 60. The specific operation processing unit $150_2$ acquires the management unit based on the input and output information metadata in accordance with a management unit acquisition order, reads the records necessary for the input data in the input buffer based on the input and output information metadata and the extraction condition metadata in accordance with an input order of the data as a processing object, and thereafter sets the necessary data items from the input buffer into the intermediate buffer. Where converting the code based on the code conversion metadata in accordance with a code conversion order, the specific operation processing unit $150_2$ sets the result thereof in the intermediate buffer, performs the derivation operation based on the derivation operation metadata in accordance with a derivation operation order, and adds the result to update the intermediate buffer until the management unit is changed.

The specific operation processing unit $150_2$ sets the contents of the intermediate buffer into the output buffer based on the data structure transformation metadata upon reception of an output buffer setting order at every change of the management unit, and writes the contents of the output buffer in the intermediate data or the multiple sets of the output data classified by objective, based on the output information metadata at every change of the management unit, in accordance with a data output order.

As described above, the specific operation processing unit $150_2$ can create the specific data by executing the specific operation process based on the various metadata.

A case of the group operation process is explained next.

Figure 13:
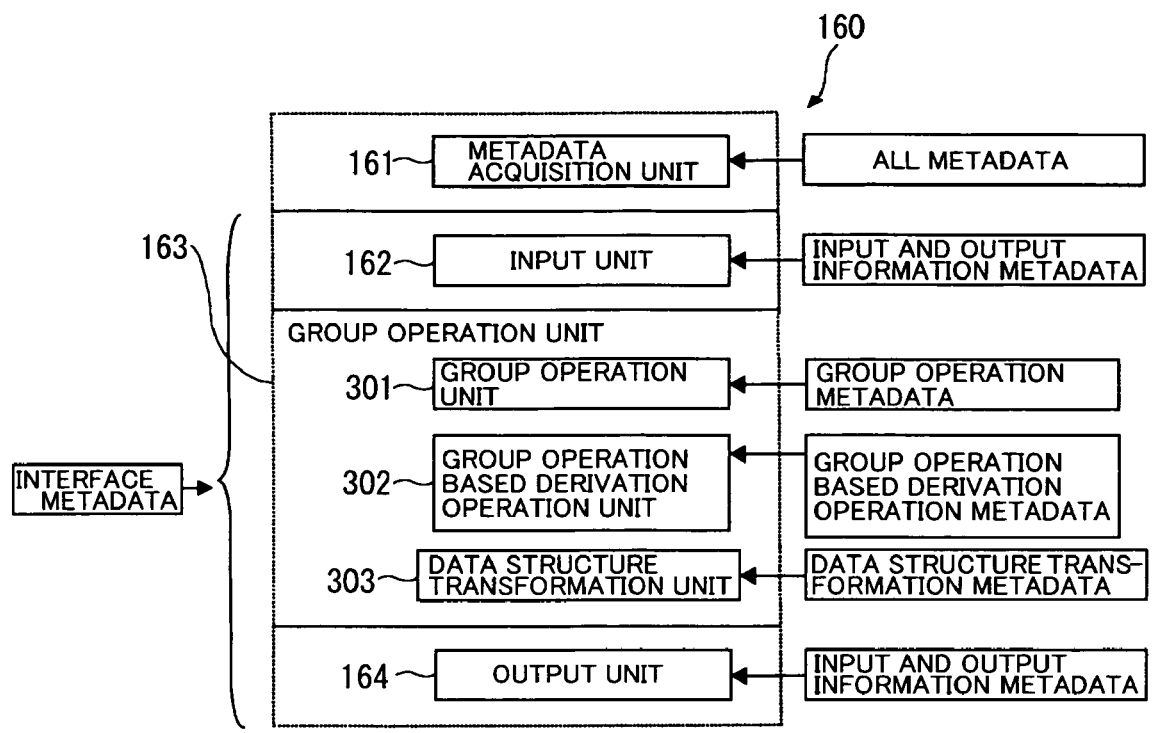
FIG. 13 is a view illustrating a structure of a group operation processing unit installed in the operation processing unit and contents of metadata.

In the batch processing apparatus, the repository 30 supplies each type of metadata to a group operation processing unit 160 for performing the group operation process structured as shown in FIG. 13 to implement the group operation process.

Herein, the aforementioned group operation unit 163 has a group operation unit 301 for performing a group operation for a summation process of the parent-child relationship existing in the input data, a group operation based derivation operation unit 302 for performing a derivation process after the group operation by the group operation unit 301, and a data structure transformation unit 303 for transforming the data structure into the output data structure.

Furthermore, the batch processing apparatus produces as the metadata necessary for the specific operation process in the repository 30, the interface metadata indicating various buffers or a relation of links between those buffers, the input and output information metadata indicating the input data and the output data, group operation metadata indicating details of the group operation, group operation based derivation operation metadata indicating the derivation operation after the group operation, and data structure transformation metadata indicating structure transformation to the output data. In the batch processing apparatus, all of these sets of metadata are supplied through the metadata acquisition unit 161 to the units, respectively.

In the batch processing apparatus, the interface metadata are first supplied through the metadata acquisition unit 161 to the input unit 162, the group operation unit 163, and the output unit 164, and various buffers or a relation of links between those buffers are clearly indicated based on the interface metadata.

Furthermore, in the batch processing apparatus, the input and output information metadata are supplied through the metadata acquisition unit 161 to the input unit 162 and the output unit 164, and the information on the input data or output data, or the management unit or a relation between the multiple sets of data is clearly indicated based on the input and output information metadata.

In the batch processing apparatus, the group operation metadata are supplied to the group operation unit 301 through the metadata acquisition unit 161, and the group operation is performed based on the group operation metadata.

In the batch processing apparatus, furthermore, the group operation based derivation operation metadata are supplied to the group operation based derivation operation unit 302 through the metadata acquisition unit 161, and the derivation operation is performed after the group operation, based on the group operation based derivation operation metadata.

In the batch processing apparatus, yet further, the data structure transformation metadata are supplied to the data structure transformation unit 303 through the metadata acquisition unit 161, and the data are transformed into the output data in a structure based on the data structure transformation metadata.

Figure 14:
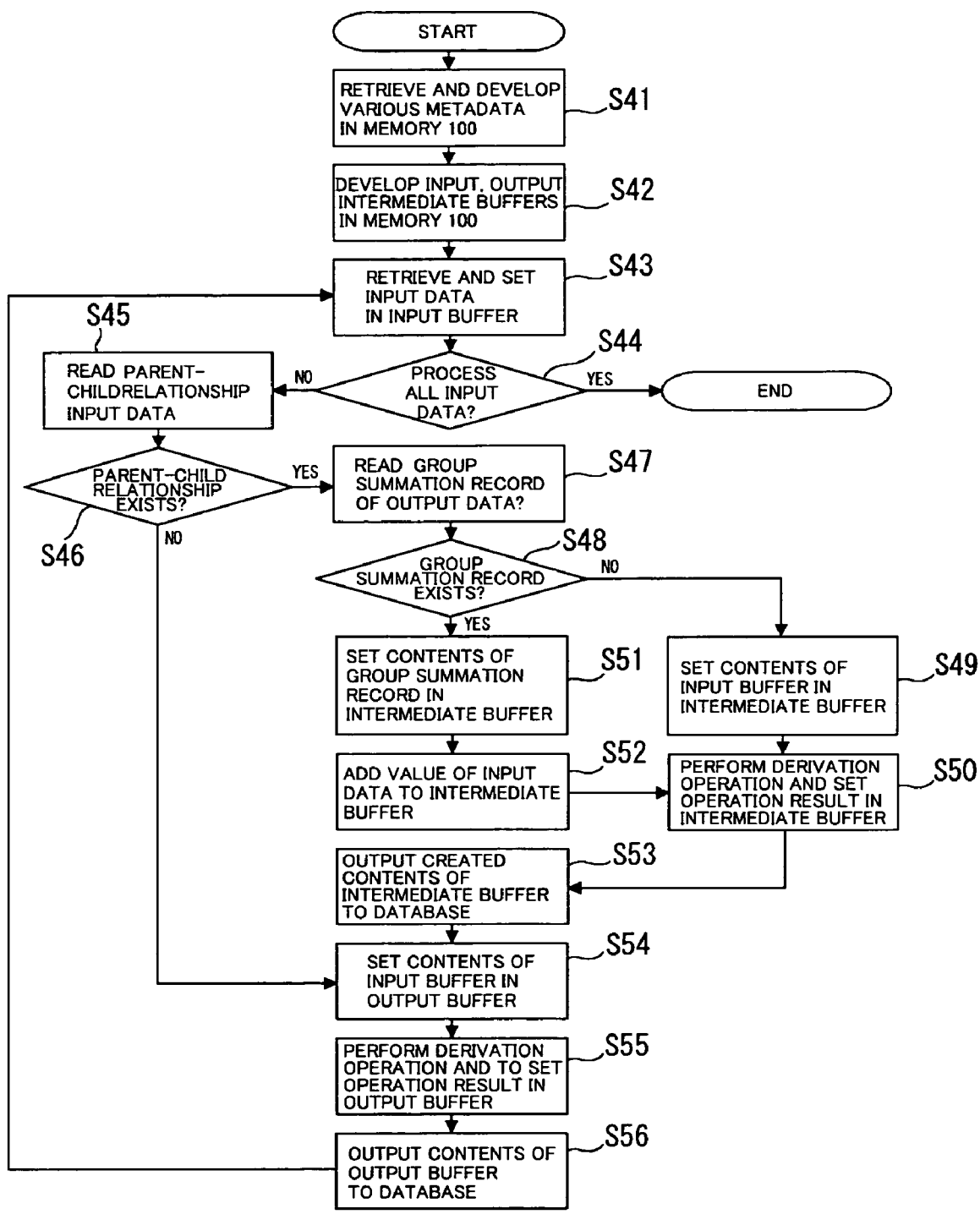
FIG. 14 is a flow chart showing a sequence of steps at the time that the group operation processing unit performs a group operation process.

The group operation processing unit 160 for performing the process based on various metadata as described above executes a series of procedural steps as shown in FIG. 14, thereby being able to implement the group operation process.

First, the group operation processing unit 160 acquires various metadata from the repository 30 at the step S41, as shown in FIG. 14, and develops the metadata in the memory 100, thereby developing in the memory 100 the input buffer for holding the input data, the intermediate buffer for processing the data, the output buffer for holding the output data, and the calculation buffer for holding a calculated result, based on the interface metadata at the step S42.

The group operation processing unit 160 reads the input data based on the input and output information metadata at the step S43, and sets the input data in the input buffer developed in the memory 100. In addition, the group operation processing unit 160 develops the multiple input buffers in the memory 100 and sets the multiple sets of the input data in each of the input buffers in a case of inputting the multiple sets of the input data.

Subsequently, the group operation processing unit 160 makes a judgment at the step S44, as to whether the process is performed for all the input data. Herein, the group operation processing unit 160 shifts the process to the step S45 in a case where the process is not yet performed for all the input data. On the other hand, the group processing unit 160 terminates a series of procedural steps upon judgment that the process is already performed for all the input data.

In a case of judgment that the process is not performed for all the input data at the step S44, the group operation processing unit 160 acquires at the step S45, data items of the input data for identifying the parent-child relationship and a calculation method from the group operation metadata, for the purpose of group calculation in the parent-child relationship, thereby making a judgment at the step S46 as to whether there is a parent-child relationship based on the acquired information.

In a case of judgment at the step S46 that there is not a parent-child relationship, the group operation processing unit 160 shifts the operation to the step S54, performs the derivation operation based on the group operation based derivation operation metadata using the group operation based derivation operation unit 302 at the step S55 after setting the contents of the input buffer into the output buffer developed in the memory 100, and sets the result of the derivation operation in the output buffer. It is to be noted that group operation processing unit 160 develops the multiple output buffers in the memory 100 in a case of outputting the multiple sets of the output data, and transforms the data into the output data in structure by establishing associations between the intermediate buffer and the multiple output buffers based on the data structure transformation metadata using the data structure transformation unit 303.

The group operation processing unit 160 then outputs the contents of the output buffer to the database at the step S56, and repeats the process from the step S43.

On the other hand, the group operation processing unit 160 shifts the process to the step S49 in a case of judgment at the step S46 that there is a parent-child relationship, and reads the group summation record to make a judgment as to whether there is the group summation record.

Herein, the group operation processing unit 160 shifts the process to the step S49 in a case of making a judgment of the non-existence of the group summation record at the step S48, and performs the group operation based on the group operation metadata using the group operation unit 301 at the step S50 after setting the contents of the input buffer in the intermediate buffer developed in the memory 100, thereby setting the result of the group operation in the intermediate buffer to shift the process to the step S53.

On the other hand, the group operation processing unit 160 shifts the process to the step S51 in a case of making a judgment of the existence of the group summation record at the step S48. The group operation processing unit 160 sets the contents of the group summation record in the intermediate buffer at the step S51, and performs the group operation based on the group operation metadata using the group operation unit 301 at the step S50 after adding the value of the input data to update the intermediate buffer, thereby setting the result of the group operation in the intermediate buffer to shift the process to the step S53.

The group operation processing unit 160 outputs the created contents of the intermediate buffer to the database at the step S53 to set the contents of the input buffer to the output buffer at the step S54. It is to be noted that the group operation processing unit 160 develops, in a case of outputting the multiple sets of the output data, the multiple output buffers in the memory 100 and transforms the data into the output data in structure by establishing associations between the intermediate buffer and the multiple output buffers based on the data structure transformation metadata using the data structure transformation unit 303.

The group operation processing unit 160 performs the derivation operation after the group operation, by using the group operation based derivation operation unit 302 at the step S55, thereby outputting the contents of the output buffer at the step S56 to repeat the process from the step S43.

The group operation processing unit 160 executes a series of procedural steps as described above, thereby being able to implement the group operation process.

That is, the group operation processing unit 160 develops various metadata in the memory 100 upon acquisition of these metadata from the repository 30 where the start instruction of the batch process is input through the display and operation unit 50 and the group operation process is started as a process to be subsequently started under the control of the process management operating unit 60. The group operation processing unit 160 reads the record necessary for the input data in the input buffer based on the input and output information metadata, in accordance with an input order of the data as a processing object, and thereafter sets the necessary data items in the intermediate data from the input buffer. Where performing the group operation based on the group operation metadata in accordance with the group operation order, the group operation processing unit 160 sets the result of the group operation into the intermediate buffer, and further performs the derivation operation after the group operation based on the group operation based derivation operation metadata in accordance with the derivation operation order after group operation, thereby setting the result of the derivation operation into the intermediate buffer.

In response to reception of the setting order to the output buffer, the group operation processing unit 160 sets the contents of the input buffer or the intermediate buffer into the output buffer based on the data structure transformation metadata, thereby writing the contents of the output buffer in the intermediate data or the multiple sets of the output data classified by objective, based on the input and output information metadata, in accordance with the data output instruction.

The group operation processing unit 160 can execute the group operation process based on various metadata, as described above.

Lastly, a case of the time-series operation process is explained.

Figure 15:
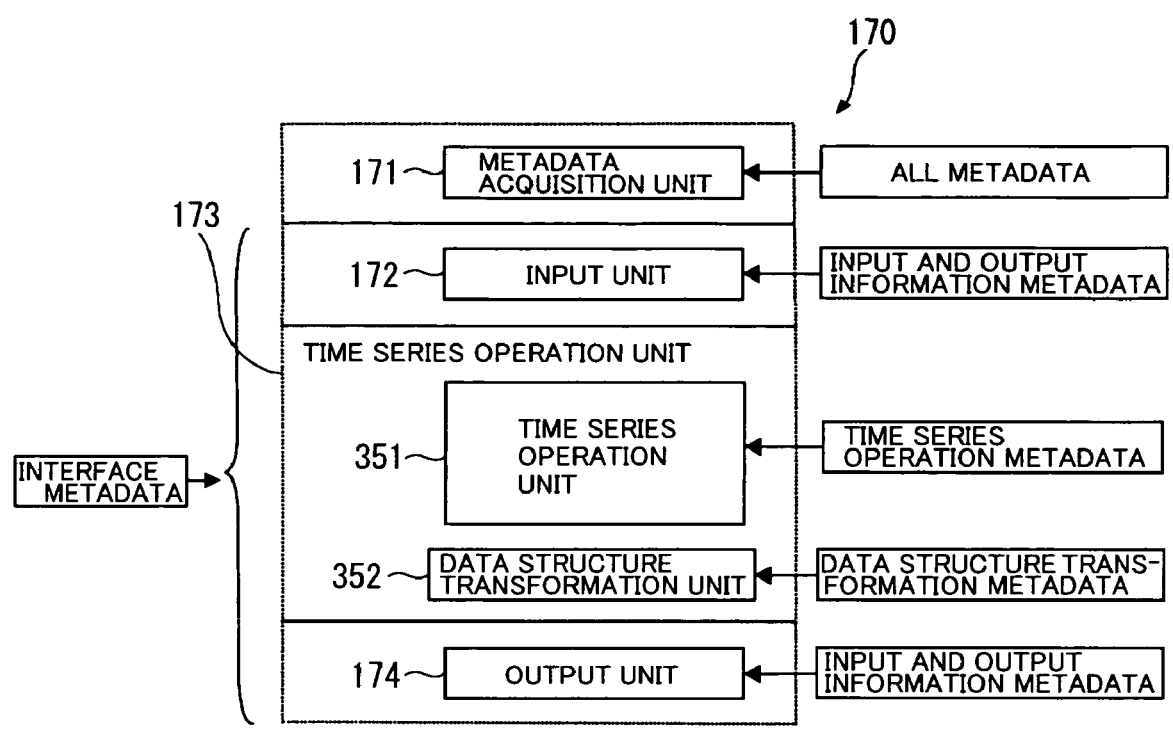
FIG. 15 is a view illustrating a structure of a time-series operation processing unit installed in the operation processing unit and contents of metadata.

In the batch processing apparatus, the repository 30 supplies each type of metadata to a time-series operation processing unit 170 for performing the time-series operation process structured as shown in FIG. 15 to implement the group operation process.

Herein, the aforementioned time-series operation unit 173 has a time-series operation unit 351 for performing a time-series operation and a data structure transformation unit 352 for transforming the data structure into the output data structure.

Furthermore, the batch processing apparatus produces as the metadata necessary for the time-series operation process in the repository 30, the interface metadata indicating various buffers or a relation of links between those buffers, the input and output information metadata indicating the input data and the output data, time-series operation metadata indicating the details of the time-series operation, and the data structure transformation metadata indicating structure transformation to the output data. In the batch processing apparatus, all of these sets of metadata are supplied through the metadata acquisition unit 171 to the units, respectively.

In the batch processing apparatus, the interface metadata are first supplied through the metadata acquisition unit 171 to the input unit 172, the time-series operation unit 173, and the output unit 174, and various buffers or a relation of links between those buffers are clearly indicated based on the interface metadata.

Furthermore, in the batch processing apparatus, the input and output information metadata are supplied through the metadata acquisition unit 171 to the input unit 172 and the output unit 174, and the information on the input data or output data, or a relation between the multiple sets of data are clearly indicated based on the input and output information metadata.

In the batch processing apparatus, the time-series operation metadata are supplied to the time-series operation unit 173 through the metadata acquisition unit 171, and the time-series operation is performed based on the time-series operation metadata.

In the batch processing apparatus, yet further, the data structure transformation metadata are supplied to the data structure transformation unit 352 through the metadata acquisition unit 171, and the data are transformed into the output data in a structure based on the data structure transformation metadata.

Figure 16:
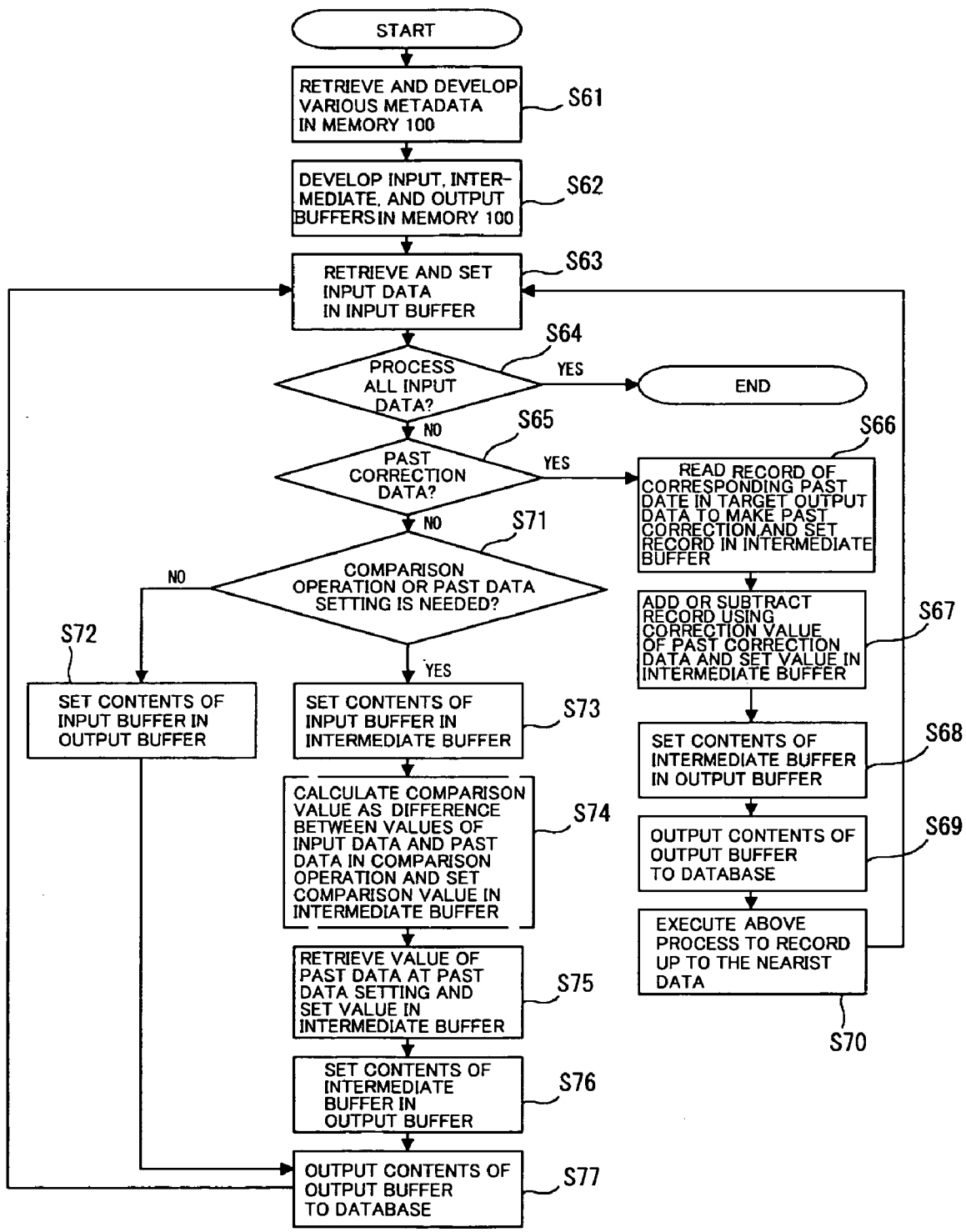
FIG. 16 is a flow chart showing a sequence of steps at the time that the time-series operation processing unit performs a time-series operation process.

The group operation processing unit 170 for performing the process based on various metadata as described above executes a series of procedural steps as shown in FIG. 16, thereby being able to implement the time-series operation process.

First, the time-series operation processing unit 170 acquires various metadata from the repository 30 at the step S61, as shown in FIG. 16, and develops the metadata in the memory 100, thereby developing in the memory 100 the input buffer for holding the input data, the intermediate buffer for processing the data, the output buffer for holding the output data, and the calculation buffer for holding a calculated result, based on the interface metadata at the step S62.

The time-series operation processing unit 170 reads the input data based on the input and output information metadata at the step S63, and sets the input data in the input buffer developed in the memory 100. In addition, the time-series operation processing unit 170 develops the multiple input buffers in the memory 100 and sets the multiple sets of the input data in each of the input buffers in a case of inputting the multiple sets of the input data.

Subsequently, the time-series operation processing unit 170 makes a judgment at the step S64, as to whether the process is performed for all the input data. Herein, the time-series operation processing unit 170 shifts the process to the step S65 in a case where the process is not yet performed for all the input data. On the other hand, the time-series processing unit 170 directly terminates a series of procedural steps upon judgment that the process is already performed for all the input data.

In a case of judgment that the process is not performed for all the input data at the step S64, the time-series operation processing unit 170 acquires at the step S65 information concerning past correction data to be acquired from the time-series operation metadata using the time-series operation unit 351, thereby making a judgment as to whether the input data are defined as the past correction data for making the past correction.

The time-series operation processing unit 170 shifts the process to the step S66 in a case of making a judgment that the input data are defined as the past correction data. The time-series operation processing unit 170 reads, using the time-series operation unit 351, the record with the past date corresponding to the output data as the target to be subject to the past correction, based on the time-series operation metadata at the step S66, thereby setting this record into the intermediate buffer developed in the memory 100.

The time-series operation processing unit 170 subsequently adds and subtracts a value of the record set into the intermediate buffer by using the correction value of the past correction data expressed by the time-series operation metadata, using the time-series operation unit 351 at the step S67, sets the corrected value into the intermediate buffer, sets the contents of the intermediate buffer into the output buffer developed in the memory 100 at the step S68, and outputs the contents of the output buffer into the database at the step S69. It is to be noted that the time-series operation processing unit 170 develops the multiple output buffers in the memory 100 in a case of outputting the multiple sets of the output data, and transforms the data into the output data in structure by establishing associations between the intermediate buffer and the multiple output buffers based on the data structure transformation metadata using the data structure transformation unit 352.

At the step S70, the time-series operation processing unit 170 executes a process from the step S66 to the step S69 for the records up to the nearest date, and repeats the process from the step S63.

On the other hand, the time-series operation processing unit 170 shifts the process to the step S71 in a case of making a judgment at the step S65 that the input data are not defined as the past correction data, and makes a judgment using the time-series operation unit 351 as to necessity of the comparison operation, the past data setting, or the like, based on the time-series operation metadata.

Herein, the time-series operation processing unit 170 shifts the process to the step S72 in a case of making a judgment at the step S71 that the comparison operation, the past data setting, or the like is not necessary, and outputs the contents of the output buffer to the database at the step S77 after setting the contents of the input buffer into the output buffer, thereby repeating the process from the step S63. In addition, the time-series operation processing nit 170 develops the multiple output buffers in the memory 100 in a case of outputting the multiple sets of the output data, and transforms the data into the output data in structure by establishing associations between the intermediate buffer and the multiple output buffers based on the data structure transformation metadata using the data structure transformation unit 352.

On the other hand, the time-series operation processing unit 170 shifts the process to the step S73 in a case of making a judgment at the step S71 that the comparison operation, the past data setting, or the like is necessary. The time-series operation processing unit 170 executes, using the time-series operation processing unit 351, the comparison operation and/ or the past data setting based on the time-series operation metadata after setting the input contents of the input buffer into the intermediate buffer.

That is, the time-series operation processing unit 170 calculates, using the time-series operation unit 351, the comparison value that is equal to a difference between values of the input data and the past data at the step S74, thereby setting the comparison value into the intermediate buffer. On the other hand, the time-series operation processing unit 170 acquires the past data using the time-series operation unit 351 at the step S75 to set this value into the intermediate buffer in a case of implementing the past data setting.

After setting the contents of the intermediate buffer into the output buffer at the step S76, the time-series operation processing unit 170 then outputs the contents of the output buffer to the database at the step S77, thereby repeating the process from the step S63. In addition, the time-series operation processing unit 170 develops the multiple output buffers in the memory 100 in a case of outputting the multiple sets of the output data, and transforms the data into the output data in structure by establishing associations between the intermediate buffer and the multiple output buffers based on the data structure transformation metadata using the data structure transformation unit 352.

The time-series operation processing unit 170 can implement the time-series operation process by executing a series of procedural steps as described above.

That is, the time-series operation processing unit 170 develops various metadata in the memory 100 upon acquisition of these metadata from the repository 30 where the start instruction of the batch process is input through the display and operation unit 50 and the group operation process is started as a process to be subsequently started under the control of the process management operating unit 60. The time-series operation processing unit 170 reads the record necessary for the input data in the input buffer based on the input and output information metadata, in accordance with an input order of the data as a processing object, and thereafter sets the necessary data items in the intermediate data from the input buffer.

Where executing the past data setting based on the past time point and the data item name of the value to be set, expressed by the time-series operation metadata, in accordance with the past data setting order, the time-series operation processing unit 170 sets the result of the past data setting into the intermediate buffer. Further, where executing the past data correction based on the past time point and the data item name of the value to be corrected, expressed by the time-series operation metadata, in accordance with a past data correction order, the time-series operation processing unit 170 sets the result of the past data correction into the intermediate buffer.

According to reception of the setting order to the output buffer, the time-series operation processing unit 170 sets the contents of the intermediate buffer into the output buffer based on the data structure transformation metadata, thereby writing the contents of the output buffer in the intermediate data or the multiple sets of the output data classified by objective to update those data at every change of the management unit, based on the time series holding period defined as a period to be held as the time-series data expressed by the time-series operation metadata, and the input and output information metadata, while deleting the record that exceeded the time-series holding period.

As described above, the time-series operation processing unit 170 can execute the time-series operation process based on various metadata.

In the batch processing apparatus, various metadata necessary for each operational step are produced, thereby being able to flexibly execute each operational step based on those various metadata.

In addition, in the batch processing apparatus, data dictionary metadata for managing the data item name in the aforementioned metadata of various types or user's view information metadata for managing a user's view of the output are not illustrated in the figures especially, but produced and registered in the repository 30 prior to execution of each of the procedural steps. The batch processing apparatus therefore can produce various metadata, thereby being able to create the output data according to the user's view.

Finally, a case for creating the aforementioned summary data is given and explained as a specific process example for the purpose of specifying a processing image of the aforementioned batch processing apparatus. Herein, a user specification to be raised is explained first, and a detailed example of the metadata required according to the user specification is explained next.

First, the input data are under the specifications shown in FIG. 17A through FIG. 17C.

In other words, the input data includes the branch office table, as shown in FIG. 17A, configured with information concerning a branch office number, a branch office name, a branch office address, a branch office type, the East Japan display, the West Japan display, or the like, the customer table, as shown in FIG. 17B, configured with information concerning a customer number, a branch office number, a name, an address, an area code, an industrial classification code, a company size code, a contract date, or the like, and the transaction table, as shown in FIG. 17C, configured with information concerning a transaction number, a customer number, a product code, a transaction code, a transaction money amount, an account day, or the like. The branch office table and the customer table of those tables are associated with each other by the branch office number while the customer table and the transaction table are associated with each other by the customer number.

Next, the user's view is defined as the "daily branch office-specific summary about business service A" configured with two specifications shown in FIG. 18 and FIG. 19, and those summary data are output as a file.

That is, the first user view with user's view number "1", which will be described later, is defined as a cross-tabulation table having as row items, the manufacturing industry, the primary industry, the secondary industry, the tertiary industry, large companies in Tokyo, medium and small companies, and an inclusive sum, and having as column items, a transaction money amount, transactions a through c money amount, transactions d and e money amount, a type-A product transaction amount, and a service charge of type-B product. Furthermore, the first user's view has headings such as, a date, a branch office number, and a branch office name. The first user's view is to be output branch office by branch office. In the first user's view, calculation of "service charge=transaction money amount×0.05" is performed as a calculation item, and a branch office is output under condition that a branch office type of a service shop is extracted. Furthermore, 30 days of the data of the first user's view are held as the time-series data. In other words, the aforementioned time-series holding period is defined as 30 days with respect to the first user's view.

As shown in FIG. 19, the second user view is defined as a cross-tabulation table having as row items, product 1, product 2, product 3, product 4, product 5, medium and small companies, and an inclusive sum, and having as column items, a transaction money amount from 0 to 5,000,000 yen, a transaction money amount from 5,000,000 yen to 10,000,000 yen, a transaction money amount more than 10,000,000 yen, a previous day's transaction money amount, and a comparison of the previous day's transaction money with that of the end of previous month. The second user's view has such headings as, a date, a branch office number, and a branch office name.

The second user's view is to be output branch office by branch office. In the second user's view, a branch office is output under the condition that a branch office type of a service shop is extracted. Furthermore, the aforementioned time-series holding period is defined as 30 days with respect to the second user's view.

Next, a relation between each code (category) and a category hierarchy follows specifications shown in FIG. 20 through FIG. 25.

First, an industrial classification code follows a specification as shown in FIG. 20. That is, formed as the industrial classification code is each of categories of the agricultural industry, the forest industry, the fishing industry, the aquaculture industry, the general industrial machine manufacturing industry, the precision machine manufacturing industry, ○○manufacturing industry, a food product, xxxx, a bank, a financing service, and ΔΔΔ. The fishing industry and the aquaculture industry of those are contained in the category hierarchy of the marine industry. The agriculture industry, the forest industry, the fishing industry, and the aquaculture industry are contained in the category hierarchy of the primary industry. The general industrial machine manufacturing industry, the precision machine manufacturing industry, ○○manufacturing industry, a food product, and xxxx are contained in the category hierarchy of the secondary industry. A bank, a financing service, and ΔΔΔ are contained in the category hierarchy of the tertiary industry.

Furthermore, an area code follows a specification shown in FIG. 21. That is, formed as an area code is each of categories of Hokkaido, . . . , Saitama, Chiba, Tokyo, Kanagawa, . . . , Okinawa, in which only Tokyo is contained in the category hierarchy of Tokyo.

Furthermore, a product code follows a specification shown in FIG. 22. That is, formed as a product code are the product 1, the product 2, the product 3, the product 4, and the product 5, in which the product 1, the product 2, the product 3, and the product 4 of those are contained in the category hierarchy of type-A product while the product 4 and the product 5 are contained in the category hierarchy of type-B product.

Furthermore, a transaction code follows a specification shown in FIG. 23. That is, formed as a transaction code are the transaction a, the transaction b, the transaction c, the transaction d, and the transaction e, in which the transaction a, the transaction b, and the transaction c are contained in the category hierarchy of "transactions a through c", while the transaction d and the transaction e are contained in the category hierarchy of "transactions d and e".

A company size code follows a specification shown in FIG. 24. That is, formed as large companies, medium companies, and small companies, in which the large companies of those are contained in the category hierarchy of the large companies while the medium companies and the small companies are contained in the category hierarchy of the medium and small companies.

Furthermore, a money amount hierarchy code follows a specification shown in FIG. 25. That is, formed as the money amount hierarchy code is each category of money amount from 0 to 5,000,000 yen, money amount from 5,000,000 yen to 10,000,000 yen, and money amount more than 10,000,000 yen. The money amount from 0 to 5,000,000 yen is contained in the category hierarchy of "money amount from 0 to 5,000,000 yen. The money amount from 5,000,000 yen to 10,000,000 yen is contained in the category hierarchy of "money amount from 5,000,000 yen to 10,000,000 yen". The money amount more than 10,000,000 yen is contained in the category hierarchy of "money amount more than 10,000,000 yen". In addition, the money amount hierarchy code is created upon judgment based on the transaction money amount.

Next, a shop table for performing the parent-child display follows a specification shown in FIG. 26.

That is, in the shop table, branch office numbers 001, 002, 003, 004, and 005 are respectively assigned to Sapporo branch office, Sendai branch office, Tokyo branch office, Osaka branch office, and Fukuoka branch office, and the flag is set such that Sapporo branch office, Sendai branch office, and Tokyo branch office correspond to the branch office to which the East Japan display is used, while Osaka branch office and Fukuoka branch office correspond the branch office to which the West Japan display is used. As a user's view, a judgment is made as to the area display, other than a value of each branch office, i.e., as to the East Japan display or the West Japan display, which is not illustrated, and the value indicating summation of the East Japan display is output as the branch office number 100 whereas the value indicating summation of the West Japan display is output as the branch office number 101.

Furthermore, other specifications concerning the handling of the past correction against the held time-series data are necessary. There is such a specification for the holding of time-series that corrects the time-series data according to a case where the past transaction money amount is corrected with respect to the transaction on the transaction specification, that is, a case where the account day is a date in the past.

The metadata produced with the metadata input unit 20 according to the aforementioned specification and registered in the repository 30 are structured in a manner as described hereinafter.

The aforementioned metadata concerning the data item name are explained first. It is to be noted that the metadata correspond to the data dictionary metadata as mentioned above.

In particular, registered as the metadata of this type in the repository are the general attribute information, the classifying attribute information, the category information, and category hierarchy information, as shown in FIG. 27A through FIG. 27D.

Set as the general attribute information are the data item names indicating the data items not holding the code values such as the branch office number, the customer name and the like, the phonetic characters for the data item names, and various other information, as shown in FIG. 27A. Set as the classifying attribute information are the data item names indicating data items holding the code items such as the product code, the industrial classification code, and the like, the phonetic characters for the data item names, and various other information, as shown in FIG. 27B. As shown in FIG. 27C, set as the category information are the classifying attribute names indicating the codes such as the product code, the industrial classification code, and the like, the category names for classifying those classifying attribute names into the categories such as the product 1, the product 2, the agricultural industry, the manufacturing industry, and so on, the phonetic characters for the code item names, the code values for the category names, and various other information. Furthermore, set as the category hierarchy information are, as shown in FIG. 27D, the classifying attribute names, the category names, the category hierarchy names for classifying those category names into the hierarchies such as the type-A product, the primary industry, and the like, respectively, and various other information.

In the batch processing apparatus, the metadata having the aforementioned contents are created with the metadata input unit 20 and registered in the repository 30, as the metadata concerning the data item name.

The aforementioned metadata concerning the input and the output are explained next. It is to be noted that the metadata of this type correspond to the aforementioned input and output information metadata. In particular, the file list, the schema about the file, the management unit, the list of files used in each process, and the relation list of files used in each process are registered in the repository 30, as shown in FIG. 28A through 28E.

Set as the file list are the business service classifications indicating the classifications of the business service previously set, such as the business service A, the table names indicating the names of tables defined as a file as the input data, such as the branch office table, the customer table, and the transaction table, and the medium type indicating the type of medium in which the file is stored, as shown in FIG. 28A. Other than those, information on the DDL (Data Definition Language) of various types necessary for control of the relational database, and the like are not illustrated but set in the repository 30. Set as the schema about the files are the business service classifications, the table names, the column names expressing a name of a column such as the branch number, the data attribute that represents the attributes of the data, the data length that represents the length, and various other information as shown in FIG. 28B. Set as the management unit are the business service classifications, the management unit names indicating the names of the management units previously set, such as the branch office, the corresponding files indicating the files such as the branch office table corresponding to this management unit, multiple column names as a primary key (PK), and other information of various, as shown in FIG. 28C. Furthermore, as shown in FIG. 28D, the business classifications, the cycles indicating the cycle classifications previously set, such as the date and the like, the management units, the specification/summary indicating either classification that the specific data are created or that the summary data are created, the input files indicating the file as the input data such as the branch office tables, the customer tables, the transaction tables, and the like, and other information of various types are set as the list of the files used in each process. As shown in FIG. 28E, the business service classifications, the cycles, the management units, the specification/summary, the file indicating the file to be used, the multiple column names as the primary key, and the multiple column names as the foreign key (FK) are set as the relation list of the files used in each process.

In the batch processing apparatus, the metadata having the aforementioned contents are produced with the metadata input unit 20 using the data item names previously shown in FIG. 27A and FIG. 27B, thereby being registered in the repository 30. Herein, the input and output information metadata about the intermediate file used internally or the output file of the user's view as a final target are produced at the same time of creation of the interface metadata, the calculation area metadata, and the data structure transformation metadata as described later, based on other input and output information metadata on the input file already defined, the user's view information metadata, and the like. In addition, on the condition that two types of user's views previously shown in FIG. 18 and FIG. 19 are defined as "the daily branch office-specific summary about the business service ○○", in FIG. 28 a through FIG. 28 E "the business service ○○", "the data", "the branch office", and "the summary" are set to the business service classification, the cycle, the management unit, and the specification/summary, respectively.

Explained next is the metadata concerning "the user's view as a target to be output", which is one of the metadata concerning "the output". It is to be noted that the metadata of this type correspond to the aforementioned user's view information metadata.

As shown in FIG. 29A through FIG. 29D, the data structure of the user's view, i.e., the structure of the output data to be actually output as the data, is registered in the repository 30. To be more specific, the name of the user's view, the heading items of the user's view, the row items of the user's view, and the column items of the user's view are registered as the metadata concerning "the user's view as a target to be output" in the repository 30.

Set as the names of the user's view are the business service classification, the cycle, the management unit, the specification/summary, the user's view name, the user's view number, the time-series holding period, and other information of various types, as shown in FIG. 29A. Furthermore, set as the heading items of the user's view are, as shown in FIG. 29B, the business service classification, the cycle, the management unit, the specification/summary, the user's view number, the attribute name indicating the attributes such as the date, the branch office number, the branch office name, and the like, and other information of various types. As shown in FIG. 29C, the business service classification, the cycle, the management unit, the specification/summary, the user's view number, the general attribute name indicating values such as the transaction money amount or the like, the classifying attribute name, the category name, and other information of various types are set as the row items of the user's view. Furthermore, set as the column items of the user's view are the business service classification, the cycle, the management unit, the specification/summary, the user's view number, the classifying attribute name, the category name, and other information of various types, as shown in FIG. 29D.

In the batch processing apparatus, as the metadata concerning "the output objective of the user's view", the metadata configured with the contents as shown in FIGS. 27A and 27B are produced with the metadata input unit 20, using the data item names previously shown in FIGS. 27A and 27B, thereby being registered in the repository 30. The batch process therefore can create and output the output data with the desired structure.

The aforementioned metadata concerning "the processing operation contents" are explained next.

The metadata as shown in FIG. 30A through FIG. 34D are concretely registered as the metadata of this type in the repository 30.

The extraction condition metadata, the code conversion metadata, and the derivation operation metadata (including the category operation based derivation operation metadata and the group operation based derivation operation metadata) are registered as the metadata concerning "the processing operation contents" in the repository 30, as shown in FIG. 30A through FIG. 30C, to follow the specifications of two types of the user's view previously shown in FIG. 18 and FIG. 19.

To be more specific, the business service classification, the cycle, the management unit, the specification/summary, the predetermined extraction condition expression, and other information of various types are set as the extraction condition metadata, as shown in FIG. 30A. As the extraction condition expression of those, a condition expression such as "a branch office type=a service shop display" is set in order to extract the branch office from the type of service shop.

Furthermore, the business service classification, the cycle, the management unit, the specification/summary, the general attribute name, the pre-converted classifying attribute/code indicating the pre-converted classifying attribute and/or the pre-converted code value, the converted classifying attribute/code indicating the converted classifying attribute and/or the converted code value, the range alteration for altering the code value to a predetermined range, and other information of various types, are set as the code conversion metadata as shown in FIG. 30B. As the converted classifying attribute/code of those, the money amount hierarchy codes are set to "from 0 to 5,000,000 yen", "from 5,000,000 yen to 10,000,000 yen", and "more than 10,000,000 yen", respectively. Correspondingly, as the range alternation, a less-than sign display of numeric values such as "0<, <500", "500<, <1,000", "<1,000" is set.

Furthermore, set as the derivation operation metadata are the business service classification, the cycle, the management unit, the specification/summary, the operation unit item indicating operation unit, the aggregation unit item indicating the aggregation unit, the predetermined condition expression, the predetermined derivation operation expression, and other information of various types, as shown in FIG. 30C. As the derivation operation expression of those, an operation expression such as "the service charge=transaction money amount× 0.05" is set.

In the batch processing apparatus, the metadata having the aforementioned contents are created as the metadata concerning "the processing operation contents" by the metadata input unit 20, using the data item names shown in FIG. 27A and FIG. 27B, thereby being registered in the repository 30. The batch processing apparatus therefore can perform the desired code conversion and the derivation operation upon extraction of the input data based on the predetermined extraction condition.

Furthermore, the group operation metadata corresponding to the classification display as shown in FIG. 31 are registered as the metadata concerning "the processing operation contents" in the repository 30 to correspond the specification set in the shop table previously shown in FIG. 26. That is, the group operation metadata corresponding to this classification display are set in a manner that the sum of the branch offices contained in the East Japan and the sum of the branch offices contained in the West Japan are calculated to output each of the calculated results as the East Japan shop with the branch office number of "100" or as the West Japan shop with the branch office number of "101", according to the East Japan display and the West Japan display set in the shop table shown in FIG. 26.

Concretely speaking, set as the group operation metadata are the business service classification, the cycle, the management unit, the specification/summary, the display data item name expressing the display data item such as, e.g., the East Japan display or the West Japan display, the set data item name expressing the set data item such as, e.g., the branch office number or the like, the set value indicating the value corresponding to this set data item name, the set contents indicating the specific set contents, and other information of various types, as shown in FIG. 31.

In the batch processing apparatus, the metadata having the aforementioned contents are produced by the metadata input unit 20, using the data item name previously shown in FIGS. 27A and 27B, thereby being registered in the repository 30. In this way, the group operation process can be executed in the batch processing apparatus.

In addition, a case where the information having the parent-child relationship exists in the input data is used as a supplementary example different from the group operation in accordance with the aforementioned specification examples.

In other words, the input data consist of the customer table configured with the information concerning the customer number, the name, the parent-customer number, the group number, the money amount, and the like, as shown in FIG. 32A, and the group representative customer table configured with the information concerning the representative customer number, the group number, and the like, as shown in FIG. 32B. The output data are defined as the customer-specific summary configured with the customer number, the parent-child classification, the money amount, and the like, as shown in FIG. 32C. With respect to the parent-child classification in the output data, the value record of the customer only is set to "0"; the total value record based on the parent-child relationship of the customer number is set to "1"; and the total value record based on the group number is set to "2".

In this case, the group operation metadata corresponding to the parent-child relationship such as shown in FIG. 33 are registered as the metadata concerning "the processing operation contents" in the repository 30. That is, the group operation metadata corresponding to the parent-child relationship are set to output the customer-specific summary based on the information having the parent-child relationship in a case of the existence of the parent-child relationship in the input data, and also to perform the first group operation based on the parent-customer number existing in the customer table as the input data as well as the second group operation based on the group number existing in the customer table.

To be more specific, set as the group operation metadata are, as shown in FIG. 33, the business classification, the cycle, the management unit, the specification/summary, the parent-item name indicating the parent-item such as, e.g., the parent-customer number or the like, the child-item name indicating the child item such as, e.g., the customer number, the group item name indicating the group item such as, e.g., the group number or the like, the parent-child classification item name, and other information of various types. Herein, with respect to the parent-child classification item name, the parent-child classification is set to "0" in a case of the single value record, set to "1" in a case of the total value record based on the parent-child relationship, and set to "2" in a case of the total value record based on the group number.

In the batch processing apparatus, in a case of the existence of the information having the parent-child relationship in the input data, the metadata having the aforementioned contents are produced as the metadata concerning "the processing operation contents" by the metadata input unit 20, using the data item name previously shown in FIG. 27A and FIG. 27B, thereby being registered in the repository 30 in order to perform the group operation. The batch processing apparatus therefore can perform the group operation in a case of the existence of the parent-child relationship in the input data.

Furthermore, as shown in FIG. 34A through FIG. 34D, the time-series operation metadata for calculating a previous day's transaction money amount and a comparison of the previous day's transaction money with that of the end of previous month are registered as the metadata concerning "the processing operation contents" to correspond to the specification of the user's view previously shown in FIG. 19. Prepared as the time-series operation metadata are the past data acquisition information indicating the past correction data to be acquired, such as the time point for data acquisition, the value item, and the like, the term indicating the time point expressed as a factor of the data item name of the output data and a comparison, i.e., the comparison value operation information indicating the operation of the value to be compared, the past data correction information indicating the method for correcting the data into the past time-series data in a case of the input data defined as the past correction data, and the time-series holding period information indicating the time-series holding period.

Concretely speaking, set as the past data acquisition information in the time-series operation metadata are, as shown in FIG. 34A, the business service classification, the cycle, the management unit, the specification/summary, the time point classification indicating the time point in a range of the data to be acquired, the value item name indicating the value, and other information of various types. With respect to the time point classification of those, the time point is set to "the previous day" to acquire the date until the previous day. With respect to the value item name, such a value as "the transaction money amount" is set.

As shown in FIG. 34B, set as the comparison value operation information in the time-series operation metadata are the business service classification, the cycle, the management unit, the specific/summary, the time point classification, the comparison classification indicating the compared target, the value item name, and other information of various types. With respect to the contrast classification of those, such a value as "the comparison with the end of previous month" is set.

Furthermore, set as the past data correction information in the time-series operation metadata are, as shown in FIG. 34C, the business service classification, the cycle, the management unit, the specification/summary, the correction classification indicating the correction method, the value item name, and other information of various types. With respect to the correction classification, such a correction method as "the retroactive correction" is set to perform the correction ex post facto.

Furthermore, set as the time-series holding period information in the time-series operation metadata are, as shown in FIG. 34D, the business service classification, the cycle, the management unit, the specification/summary, the holding period indicating the time-series holding period, and other information of various types. With respect to the holding period of those, the period of "30 days" is set to hold the data of 30 days as the time-series data.

As the metadata concerning "the processing operation contents", the metadata having the aforementioned contents that are produced by the metadata input unit 20, thereby being registered in the repository 30 so that the batch processing apparatus can perform the time-series operation. The batch processing apparatus therefore can hold the time-series holding period, i.e., 30 days of the time-series data previously shown in FIG. 29A so that the held time-series data reflects the past correction data of the transaction money amount.

Next, shown in FIG. 35A through FIG. 36B are the specific examples of the metadata produced based on the various metadata shown in FIG. 28A through 28E, FIG. 29A through 29D, FIG. 30A through FIG. 30C, FIG. 31, and FIG. 34A through FIG. 34D.

To be more specific, the interface metadata indicating the layouts of the input buffer temporally storing the data in each process, the intermediate buffer, and the output buffer, the calculation area metadata indicating the classifying attribute information and the value item information of the calculation area used by the summary operation processing unit $150_1$, and the data structure transformation metadata indicating the relation of the link between the buffer and the output buffer are produced as the metadata produced in the aforementioned procedural steps, and thereby registered in the repository 30, as shown in FIG. 35A through FIG. 36B.

Concretely speaking, set as the interface metadata are, as shown in FIG. 35A, the business service classification, the cycle, the management unit, the specification/summary, the task detail indicating the detail of the task to be executed, the processing operation contents indicating the specific detail of the process to be executed in the task, the data item name, and other information of various types. Such a detail concerning "the category operation (the summary operation)", "the group operation", or "the time-series operation" is set as the task detail of those, whereas such a detail concerning "the input" or "condition judgment" is set as the processing operation contents.

Furthermore, set as the calculation area metadata indicating the classifying attribute information of the calculation buffer are, as shown in FIG. 35B, the business service classification, the cycle, the management unit, the specification/summary, the classifying attribute name, the category name, the set number indicating the row number of the calculation buffer to be output, the calculation area metadata indicating the value item information of the calculation buffer to be described later, and other information of various types.

Furthermore, set as the calculation area metadata indicating the value item information of the calculation buffer are, as shown in FIG. 36A, the business service classification, the cycle, the management unit, the specification/summary, the value item number, the value item name, and other various information.

Yet further, set as the data structure transformation metadata are, as shown in FIG. 36B, the business service classification, the cycle, the management unit, the specification/summary, the set number, the value item number, the user's view number, the column number, the row number, and other information of various types.

Based on the various metadata preliminarily registered in the repository 30, the metadata having the aforementioned contents are produced under the production instruction by the metadata input unit 20, and are thereby registered in the repository 30 in the batch processing apparatus. In the batch processing apparatus, furthermore, the input and output information metadata about the intermediate file internally used or the output file of the user's view as the final target are produced by the metadata input unit 20 at the time of the production of the aforementioned metadata, thereby being registered in the repository 30, as described above.

In the batch processing apparatus, various metadata shown in FIG. 27A through 36B are registered in the repository 30, and the process for each of the category operation (the summary operation), the group operation, and the time-series operation is produced based on the aforementioned various metadata, to create the network of the process, indicating the start order of the arbitrary processes. The batch processing apparatus creates the desired output data by giving the start instruction of the batch process through the process management operating unit 60.

Figure 37:
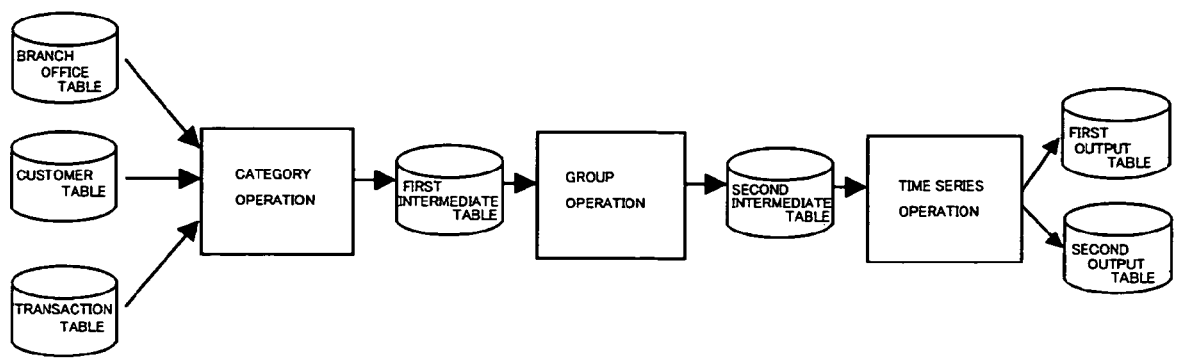
FIG. 37 is a view illustrating a process flow in accordance with a specification shown in FIG. 17A through FIG. 26.

To be more specific, the batch processing apparatus executes the category operation (the summary operation process) using the summary operation processing unit $150_1$ to create the single first intermediate table as the intermediate data in a case where the branch office table, the customer table, and the transaction table such as previously shown in FIG. 17A through FIG. 17C are input as the input data, as shown by the process flow in FIG. 37.

Concretely speaking, the first intermediate table is configured with the information concerning the date, the branch office number, the industrial classification code, the area code, the company size code, the transaction code, the product code, the money amount hierarchy code, the transaction money amount, and the service charge, as shown in FIG. 38.

Subsequently, as shown in FIG. 37, the batch processing apparatus executes the group operation using the group operation processing unit 160 on the condition that the first intermediate table shown in FIG. 38 is set to the input data, so as to create the single second intermediate table as the intermediate data.

The second intermediate table, as shown specifically in FIG. 39, is configured with the information reflecting the result of the group operation with respect to the same items as that of the first intermediate table.

As shown in FIG. 37, the batch processing apparatus executes the time-series operation using the time-series operation processing unit 170 on the condition that the second intermediate table shown in FIG. 39 is set as the input data, to create the first output table and the second output table as the desired output data corresponding to two specifications of the user's view previously shown in FIG. 18 and FIG. 19.

To be more specific, the first output table is configured with the information concerning the date, the branch office number, the industrial classification code, the area code, the company size code, the transaction money amount, the transaction money amounts a through c, the transaction money amounts d and e, the transaction money amount of the type-A product, and the type-B product service charge, as shown in FIG. 40.

In other words, the first output table is such that the multiple records are summarized in the single table on the condition that the cross-tabulation table previously shown as the first user's view in FIG. 18 is created as a single record for each of the industrial classification code, the area code, and the company size code branch office by branch office. In addition, with respect to the first output table, the date, the branch office number, and the branch office name as the heading of the first user's view are set for each of the records.

The second output table is configured with the information concerning the date, the branch office number, the product code, the company size code, the transaction money amount from 0 to 5,000,000 yen, a transaction money amount from 5,000,000 yen to 10,000,000 yen, a transaction money amount more than 10,000,000 yen, a previous day's transaction money amount, and a comparison of the previous day's transaction money with that of the end of previous month, as specifically shown in FIG. 41. That is, the second output table is such that the multiple records are summarized in the single table on the condition that the cross-tabulation table previously shown as the second user's view in FIG. 19 is created for both the product code and the company size code. With respect to the second output table also, it is to be noted that the date, the branch office number, and the branch office name as the heading of the second user's view are set in each of the records.

In the batch processing apparatus, as described above, various metadata shown in FIG. 27A through FIG. 34D are created by the metadata input unit 20, in accordance with the specifications shown in FIG. 17A through FIG. 26, and registered in the repository 30, so that the batch processing apparatus can create and output two output tables shown in FIG. 40 and FIG. 41. Since the process is executed based on the metadata, the batch processing apparatus can deal with such a case where multiple specifications are required for the output data, thereby being able to create the output data configured with multiple different specifications at once.

It is to be noted that specification described above is that such as creating "daily branch office-specific summary about business service A" but there is no difference with respect to the creation of the specific data based on the other specifications, in that the batch processing apparatus creates the metadata corresponding to the appropriate specification and executes each process based on the aforementioned metadata.

As described above, the batch processing apparatus as the embodiment of this invention previously registers the necessary metadata of various types, and creates the output data by processing the input data based on the declaration process of the metadata, so that the management of the metadata is unified and the structure of the output data is determined based on the combination of the multiple sets of metadata. Therefore, all of the output data related to the aforementioned metadata are properly affected by the change of the metadata, thereby being able to be automatically changed by the change of the metadata only.

The batch processing apparatus thus can promote improvement in the product efficiency and quality retention. Furthermore, with the batch processing apparatus, a burden on a system designer, a system administrator, and an operator operating the system can be remarkably reduced since the non-programming approach or the metadata approach renders certain operational management such as the system design or the program development, the document management, the library management, and the like unnecessary at all, so that the batch processing apparatus can establish remarkable reduction in the future development cost.

Furthermore, the batch processing apparatus operates by defining the business service specification, and thus has no trouble in performance resulting from the development of a new program, thereby being able to retain the quality. The batch processing apparatus operates based on the metadata, thereby being able to constantly keep compatibility between the output name and the output data, and the like.

The batch processing apparatus enables people conducting the process using the batch processing apparatus to share their knowledge or to exclude personal knowledge as well as enabling people to share knowledge company-wide and to easily browse knowledge contents regardless of the agent or time. The batch processing apparatus, furthermore, wipes out programming by the user, thereby enabling the reduction of the staff cost, the deskwork cost, and the like.

Furthermore, not only can the batch processing apparatus respond to the user needs immediately, but it can also run a simulation on a real system immediately as well as spirally even in a case where the output information necessary for the new business service needs is required, so that improvement in productivity or new discovery at the stage of business project can be achieved.

The batch processing apparatus can produce the process flow, the intermediate data, and the like automatically, thereby being able to preclude a so-called process jumble or data jumble.

As described above, the batch processing apparatus can provide the system designer, the system administrator, and the operator with excessive convenience.

It is to be noted that this invention is not limited to the above-described embodiment in which the batch processing apparatus is explained as if it is configured with a single computer or the like, but this invention can be applied to a case of a batch processing system established by connecting the multiple computers to one another through the network or the like.

That is, as the batch processing system, the display and operation unit 10 and/or the metadata input unit 20 may be configured with a single computer to be connected to the repository 30 on the condition that a side for the system designer, the system administrator, and the like are separated from a side for the operator while the operation processing unit 40 may be configured with a single computer or the like as the batch processing apparatus to be connected to the repository 30. As the batch processing apparatus, the display and operation unit 50 and the process management operating unit 60 may be configured with a single computer or the like to be connected to a computer or the like as the operation processing unit 40 through the network or the like. As described above, this invention can provide various services with improvement in convenience by setting the batch processing apparatus to be a distributed environment type.

As described above, this invention can be arbitrarily modified without departing from the scope thereof.

What is claimed is:

1. A batch processing apparatus for creating desired output data based on arbitrary input data comprising:
   a metadata acquisition section for acquiring from a predetermined memorizing section, metadata being defined as information concerning at least data item name, input, processing operation content, and output, as well as information previously stored in the memorizing section;
   a data input section for inputting the input data based on a declaration process of the metadata acquired through the metadata acquisition section, the data input section including a display monitor;
   a processing section for creating the output data by processing the input data input through the data input section, based on the declaration process of the metadata acquired through the metadata acquisition section; and
   a data output section for outputting the output data created by the processing section, based on the declaration process of the metadata acquired through the metadata acquisition section,
   wherein the processing section includes a summary operation processing section for performing a summary operation process produced in a case of creation of summary data, a specific operation processing section for performing a specific operation process produced in a case of creation of specific data, a group operation processing section for performing a group operation process, defined as a group calculation with respect to a parent-child relationship existing in the input data, and a time-series operation processing section for performing a time-series operation process for updating time-series data,
   wherein the processing section newly produces information indicating a process flow of a batch process necessary to create objective output data, information indicating a content of intermediate data created at each process, and information concerning a link between the input and output data at each process as metadata upon process execution to register in the memorizing section, where the metadata previously registered in the memorizing section are stored in a predetermined memory, where the output data created by both or either of the summary operation process and the specification operation process are used as input data of the group operation process for each of business service unit, processing cycle, management unit, and specification/summary classification, where the output data created by the group operation process is used as input data of the time-series operation process, and where both or either of the summary operation process and the specific operation process, the group operation process, and the time-series operation process are formed into a serial process flow, and
   wherein the processing section starts both or either of the summary operating processing section and the specific operation processing section based on an execution sequence of each process according to the executing process defined by the metadata upon the process execution registered in the memorizing section, to its running timing, and to the process flow to execute each process, and, where both or either of the group operation metadata and the time-series operation metadata exists, the processing section starts each process to execute both or either of the group operation processing section and the time-series operation processing section by using output data created at the other processing section as input data and thereby to produce the objective output data.

2. The batch processing apparatus according to claim 1, wherein the metadata expresses a data item of the input data, a format of the input data, a category expressed with a code in a case of the data item having the code, a category hierarchy configured with a combination of the categories, a data item of the output data, a format of the output data, a management unit for expressing an output unit of the output data with the data item as a factor, an extraction condition expression expressed with data item of the input data as a factor, a derivation operation expression for expressing the output data derived based on the data item of the input data, a code conversion content and a code conversion method for converting a value of the data item of the input data into a code of the output data, the data item of the input data and a calculation method for identifying the parent-child relationship for the group operation on the parent-child relationship, a term indicating comparison with a time point expressed as a factor of the data item name of the output data to be output in the time-series operation, and/or a method for correcting past time-series in a case of the input data being past correction data.

3. The batch processing apparatus according to claim 1, wherein the metadata express at least one of a process flow of the batch process, a content of intermediate data created in each process, and a link between the input data and the output data in each process.

4. The batch processing apparatus according to claim 3, wherein the metadata expresses a data item of the input data, a format of the input data, a category expressed with a code in a case of the data item having the code, a category hierarchy configured with a combination of the categories, a data item of the output data, a format of the output data, a management unit for expressing an output unit of the output data with the data item as a factor, an extraction condition expression expressed with data item of the input data as a factor, a derivation operation expression for expressing the output data derived based on the data item of the input data, a code conversion content and a code conversion method for converting a value of the data item of the input data into a code of the output data, the data item of the input data and a calculation method for identifying the parent-child relationship for the group operation on the parent-child relationship, a term indicating comparison with a time point expressed as a factor of the data item name of the output data to be output in the time-series operation, and/or a method for correcting past time-series in a case of the input data being past correction data.

5. The batch processing apparatus according to claim 3, wherein the metadata express at least one of a process flow of the batch process, a content of intermediate data created in each process, and a link between the input data and the output data in each process.

6. A batch processing method for creating desired output data based on arbitrary input data comprising:

a metadata acquisition step for using a metadata acquisition section to acquire metadata from a predetermined memorizing section, metadata being defined as information concerning at least data item name, input, a processing operation content, and output, as well as information previously stored in the memorizing section;

a data input step for using a data input section to input the input data based on a declaration process of the metadata acquired at the metadata acquisition step, the data input section including a display monitor;

a processing step for using a processing section to create the output data by processing the input data input at the data input step, based on the declaration process of the metadata acquired at the metadata acquisition step; and a data output step for using a data output section to output the output data created at the processing step, based on the declaration process of the metadata acquired at the metadata acquisition step, wherein in the processing step, the processing section includes a summary operation processing step for rendering a summary operation processing section perform a summary operation process produced in a case of creation of summary data, a specific operation processing step for rendering a specific operation processing section perform a specific operation process produced in a case of creation of specific data, a group operation processing step for rendering a group operation processing section perform a group operation process, defined as a group calculation with respect to a parent-child relationship existing in the input data, and a time-series operation processing step for executing a time-series operation process for updating time-series data via a time-series operation processing section, wherein in the processing step, the processing section newly produces information indicating a process flow of the batch process necessary to create objective output data, information indicating a content of the intermediate data created at each process, and information concerning a link between the input and output data at each process as metadata upon process execution to register in the memorizing section, where the metadata previously registered in the memorizing section are stored in a predetermined memory, where the output data created by both or either of the summary operation process and the specification operation process are used as input data of the group operation process for each of business service unit, processing cycle, management unit, and specification/summary classification, where the output data created by the group operation process is used as input data of the time-series operation process, and where both or either of the summary operation process and the specific operation process, the group operation process, and the time-series operation process are formed into a serial process flow, and wherein in the processing step, the processing section starts both or either of the summary operating processing section and the specific operation processing section based on an execution sequence of each process according to the executing process defined by the metadata upon the process execution registered in the memorizing section, to its running timing, and to the process flow to execute each process, and, where both or either of the group operation metadata and the time-series operation metadata exists, the processing section starts each process to execute both or either of the group operation processing section and the time-series operation processing section by using output data created at the other processing section as input data and thereby to produce the objective output data.

7. A non-transitory computer-readable storage medium that stores a set of instructions for a batch processing program which, when executed by a computer, performs a method for creating desired output data based on arbitrary input data, said method comprising:

- a metadata acquisition process for using a metadata acquisition section to acquire from a predetermined memorizing section, metadata defined as information concerning at least data item name, input, a processing operation content, and output, as well as information previously stored in the memorizing section;
- a data input process for using a data input section to input the input data based on a declaration process of the metadata acquired in the metadata acquisition process;
- a processing process for using a processing section to create the output data by processing the input data input in the data input process, based on the declaration process of the metadata acquired in the metadata acquisition process; and
- a data output process for using a data output section to output the output data created in the processing process, based on the declaration process of the metadata acquired in the metadata acquisition process,
- wherein the processing section functions as a summary operation processing section for performing a summary operation process produced in a case of creation of summary data, a specific operation processing section for performing a specific operation process produced in a case of creation of specific data, a group operation processing section for performing a group operation process, defined as a group calculation with respect to a parent-child relationship existing in the input data, and a time-series operation processing section for performing a time-series operation process for updating time-series data,
- wherein the processing section newly produces information indicating a process flow of the batch process necessary to create objective output data, information indicating a content of intermediate data created at each process, and information concerning a link between the input and output data at each process as metadata upon process execution to register in the memorizing section, where the metadata previously registered in the memorizing section are stored in a predetermined memory, where the output data created by both or either of the summary operation process and the specification operation process are used as input data of the group operation process for each of business service unit, processing cycle, management unit, and specification/summary classification, where the output data created by the group operation process is used as input data of the time-series operation process, and where both or either of the summary operation process and the specific operation process, the group operation process, and the time-series operation process are formed into a serial process flow and
- wherein the processing section starts both or either of the summary operating processing section and the specific operation processing section based on an execution sequence of each process according to the executing process defined by the metadata upon the process execution registered in the memorizing section, to its running timing, and to the process flow to execute each process, and, where both or either of the group operation metadata and the time-series operation metadata exists, the processing section starts each process to execute both or either of the group operation processing section and the time-series operation processing section by using output data created at the other processing section as input data and thereby to produce the objective output data.

* * * * *